(12) United States Patent
Kim et al.

(10) Patent No.: US 10,959,001 B2
(45) Date of Patent: Mar. 23, 2021

(54) ELECTRONIC DEVICE INCLUDING STYLUS PEN AND METHOD FOR CONTROLLING MICROPHONE OF THE SAME

(71) Applicant: Samsung Electronics Co., Ltd., Gyeonggi-do (KR)

(72) Inventors: Gahee Kim, Gyeonggi-do (KR); Myeongwan Gang, Gyeonggi-do (KR); Jaeha Park, Gyeonggi-do (KR); Jungyeol An, Gyeonggi-do (KR); Gangyoul Kim, Gyeonggi-do (KR); Juntai Kim, Gyeonggi-do (KR); Dongmoon Ok, Gyeonggi-do (KR); Hyunjong Roh, Gyeonggi-do (KR); Hochul Hwang, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/435,675

(22) Filed: Jun. 10, 2019

(65) Prior Publication Data
US 2019/0379959 A1    Dec. 12, 2019

(30) Foreign Application Priority Data

Jun. 8, 2018  (KR) .................. 10-2018-0066319

(51) Int. Cl.
*H04R 1/04*    (2006.01)
*G06F 1/16*    (2006.01)
*G06F 3/0354*    (2013.01)
*G06F 3/038*    (2013.01)
*H02J 7/02*    (2016.01)
(Continued)

(52) U.S. Cl.
CPC ............ *H04R 1/04* (2013.01); *G06F 1/1656* (2013.01); *G06F 3/038* (2013.01); *G06F 3/03545* (2013.01); *H02J 7/025* (2013.01); *H04R 1/406* (2013.01); *H04R 3/005* (2013.01); *G06F 1/1626* (2013.01); *H04R 2420/07* (2013.01)

(58) Field of Classification Search
CPC .... G06F 3/0354; G06F 3/03545; G06F 3/167; H04R 1/406; H04R 3/005; H04B 1/38
See application file for complete search history.

(56) References Cited

U.S. PATENT DOCUMENTS 8,489,151 B2    7/2013  Van Engelen et al.
8,522,309 B2 †   8/2013  Yoffe
(Continued)

OTHER PUBLICATIONS

International Search Report dated Sep. 16, 2019.
European Search Report dated Oct. 25, 2019.

*Primary Examiner* — Alexander Eisen
*Assistant Examiner* — Nathaniel P Brittingham
(74) *Attorney, Agent, or Firm* — Cha & Reiter, LLC.

(57) ABSTRACT

An electronic device and method are disclosed. The electronic device includes a housing, microphone, wireless communication circuit, processor, memory, and stylus pen. The processor is configured to implement the method, including: when the stylus pen is located in the elongated hole, operate both the at least one first microphone and the second microphone to detect sound, and when the stylus pen is not located in the elongated hole, operate only the first microphone to detect sound.

23 Claims, 18 Drawing Sheets

(51) Int. Cl.
*H04R 1/40* (2006.01)
*H04R 3/00* (2006.01)

(56) References Cited

U.S. PATENT DOCUMENTS

| | | | |
|---|---|---|---|
| 2002/0136092 A1* | 9/2002 | Sakuyama | G04C 11/02 368/10 |
| 2006/0068851 A1* | 3/2006 | Ashman, Jr. | G06F 1/1626 455/566 |
| 2013/0307829 A1 | 11/2013 | Libin | |
| 2014/0168176 A1* | 6/2014 | Nowatzyk | G06F 3/0346 345/179 |
| 2014/0253467 A1 | 9/2014 | Hicks et al. | |
| 2015/0065200 A1 | 3/2015 | Namgung et al. | |
| 2016/0277835 A1* | 9/2016 | Kim | H04R 1/028 |
| 2017/0006372 A1* | 1/2017 | Yang | H04M 1/6058 |
| 2017/0078300 A1* | 3/2017 | He | G06F 13/385 |
| 2017/0212100 A1 | 7/2017 | Kwak et al. | |
| 2018/0032160 A1 | 2/2018 | Park et al. | |
| 2018/0032163 A1* | 2/2018 | Park | G06F 3/044 |
| 2018/0088690 A1 | 3/2018 | Seo et al. | |
| 2019/0379959 A1* | 12/2019 | Kim | G06F 3/0383 |

\* cited by examiner
† cited by third party

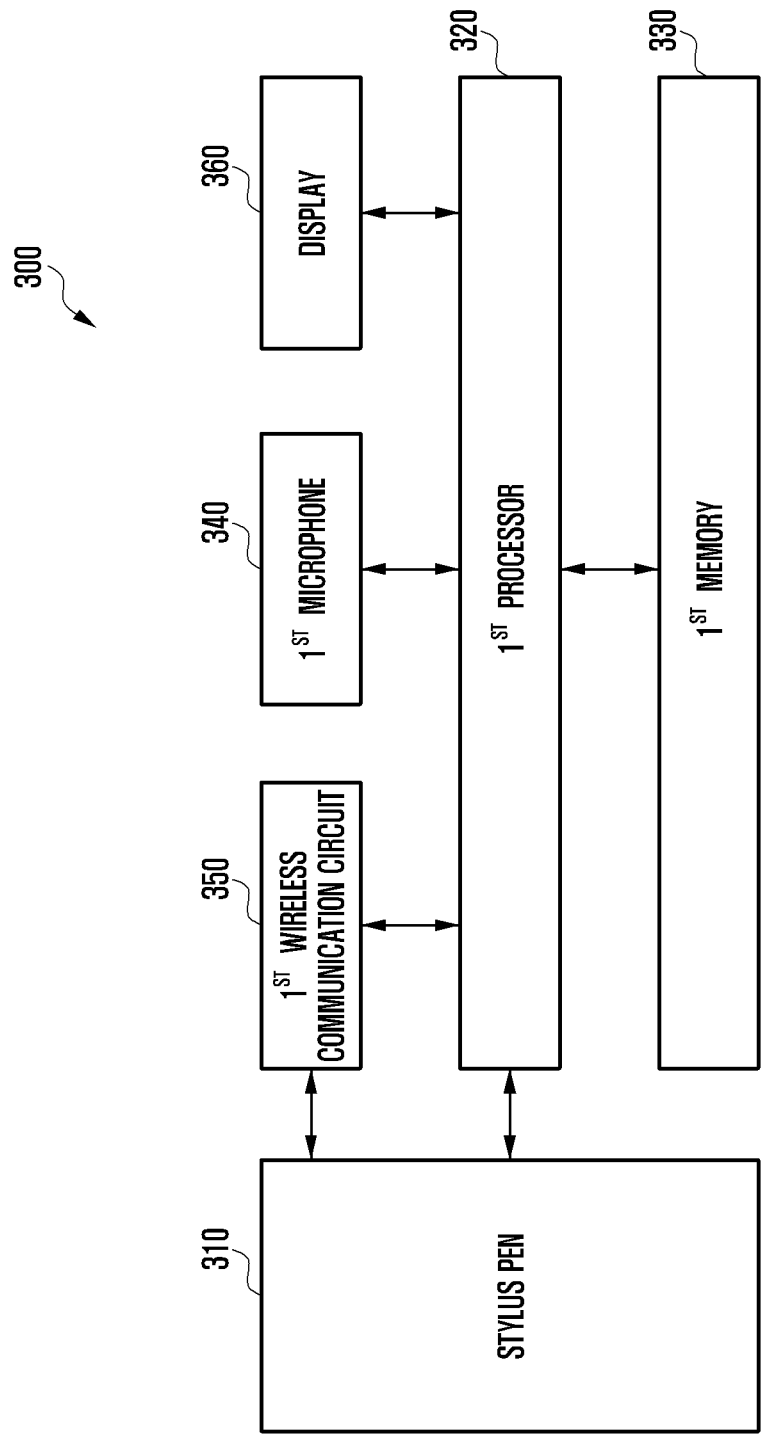

FIG. 9
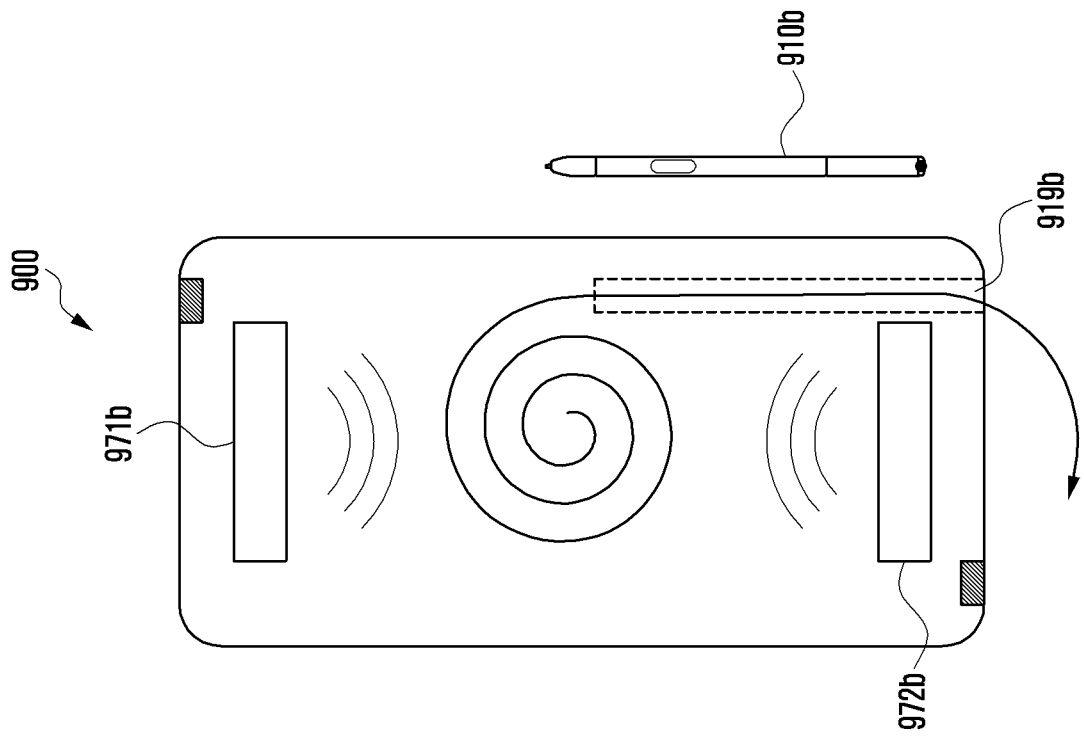
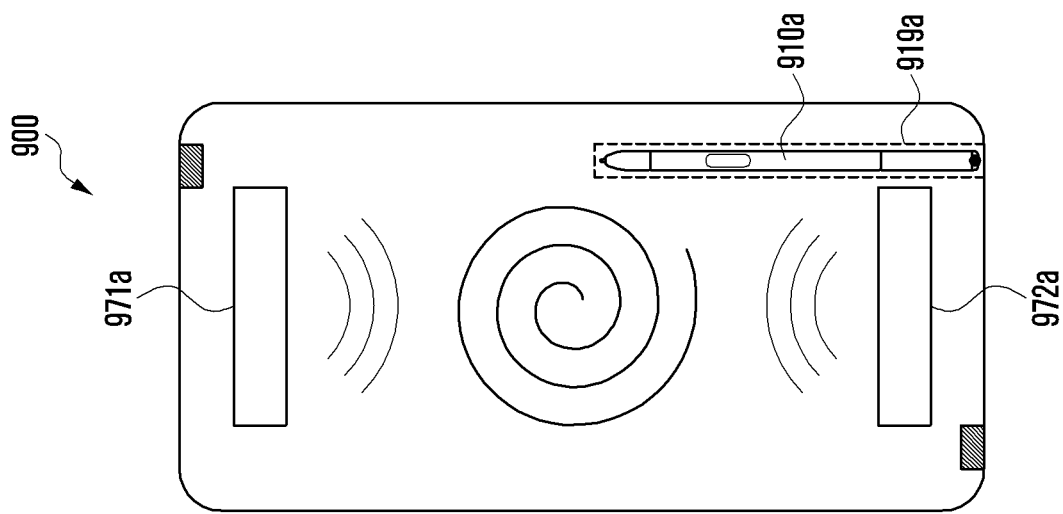

ELECTRONIC DEVICE INCLUDING STYLUS PEN AND METHOD FOR CONTROLLING MICROPHONE OF THE SAME

CROSS-REFERENCE TO RELATED APPLICATION(S)

This application is based on and claims priority under 35 U.S.C. 119 to Korean Patent Application No. 10-2018-0066319, filed on Jun. 8, 2018, in the Korean Intellectual Property Office, the disclosures of which are herein incorporated by reference in their entireties.

TECHNICAL FIELD

The disclosure relates to an electronic device and, particularly, to an electronic device including a stylus pen detachable from the electronic device used for a user input.

BACKGROUND

With the recent growth of mobile communication and hardware/software technologies, portable electronic devices (hereinafter referred to as "electronic devices") such as smart phones have evolved to incorporate diverse kinds of functions. The electronic device has the ability to collect sound data such as a user's voice through a microphone. In addition, the electronic device may include a plurality of microphones and operate a variety of call and/or audio solutions by processing sound data received from the plurality of microphones.

Meanwhile, the electronic device is capable of receiving a user input through a touch screen, and an additional input tool such as a stylus pen is provided for allowing a user to enter a more precise touch input (or hovering input). The stylus pen is often stowable when not in use, and may thus be inserted into and detached from the electronic device.

In order to improve audio performance associated with the microphone, the electronic device may be equipped with many microphones. However, a microphone mounted inside the housing of the electronic device requires a space open to the outside of the housing in order to allow collection of external sounds. Therefore, implementing an electronic device with multiple microphones may result in difficulties due to the limitations on available mounting space.

SUMMARY

The disclosure provides an electronic device including a stylus pen in which a microphone is mounted, and having the ability to operate an appropriate call and/or audio solution depending on whether the microphone is attached or detached.

According to certain embodiments of the disclosure, an electronic device may include a housing, at least one first microphone disposed within the housing and exposed through a first portion of the housing, a first wireless communication circuit disposed within the housing, an elongated hole formed in a second portion of the housing, a stylus pen detachably inserted into the elongated hole and including a second microphone, a processor disposed within the housing and functionally connected to the at least one first microphone and the first wireless communication circuit, and a memory disposed within the housing and functionally connected to the processor. The memory may store instructions that are executable by the processor to cause the electronic device to: when the stylus pen is located in the elongated hole, operate both the at least one first microphone and the second microphone to detect sound, and when the stylus pen is not located in the elongated hole, operate only the first microphone to detect sound.

According to certain embodiments of the disclosure, an electronic device may include a housing, at least one first microphone disposed within the housing and exposed through a first portion of the housing, a first wireless communication circuit disposed within the housing, an elongated hole formed in a second portion of the housing, a stylus pen detachably inserted into the elongated hole and including a second microphone, a processor disposed within the housing and functionally connected to the at least one first microphone and the first wireless communication circuit, and a memory disposed within the housing and functionally connected to the processor. The memory may store instructions executable by the processor to cause the electronic device to: cause the electronic device to: when the stylus pen is located in the elongated hole, operate both the at least one first microphone and the second microphone to detect sound, and when the stylus pen is not located in the elongated hole, operate only the second microphone to detect sound According to certain embodiments of the disclosure, a method for controlling a microphone of an electronic device may include identifying, by a sensor circuit, whether a stylus pen is located within an elongated hole formed in a housing of the electronic device, when the stylus pen is located within the elongated hole, operating the first microphone and a second microphone of the stylus pen to detect sound, and using only the second microphone when the stylus pen is removed from the elongated hole.

BRIEF DESCRIPTION OF THE DRAWINGS

FIG. 3 is a block diagram illustrating an electronic device according to certain embodiments.

FIG. 9 is a diagram illustrating characteristics of sound outputted depending on whether a stylus pen is attached or detached according to certain embodiments.

DETAILED DESCRIPTION

Figure 1:
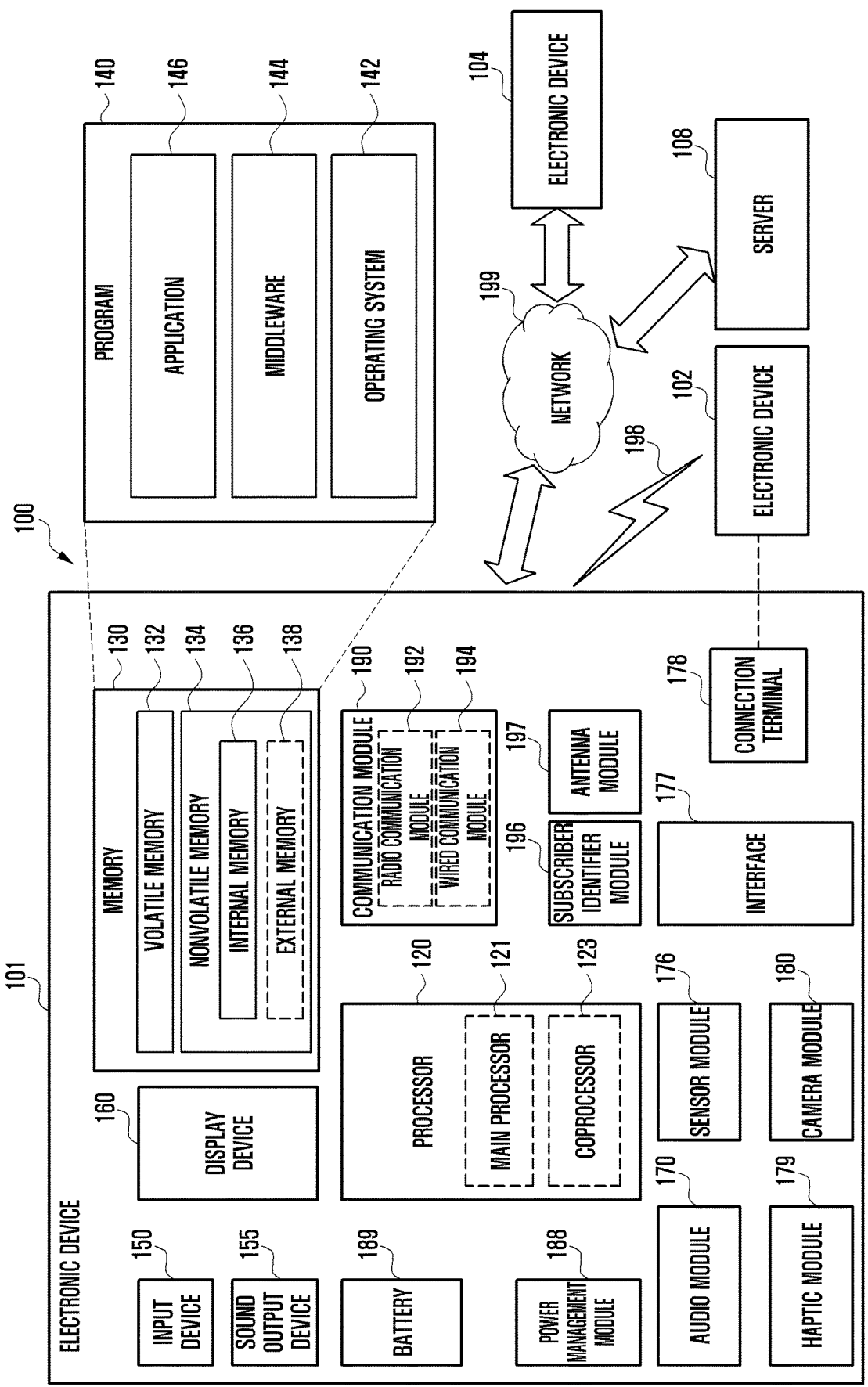
FIG. 1 is a block diagram illustrating an electronic device in a network environment according to certain embodiments.

FIG. 1 is a block diagram illustrating an electronic device 101 in a network environment 100 according to certain embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform certain data processing or computation. According to an embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store certain data used by at least one component (e.g., the processor 120 or the sensor module 176) of the electronic device 101. The certain data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These certain types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element implemented by a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to certain embodiments may be one of certain types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include certain changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases. As used herein, such terms as "1$^{st}$" and "2$^{nd}$", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

Figure 2A:
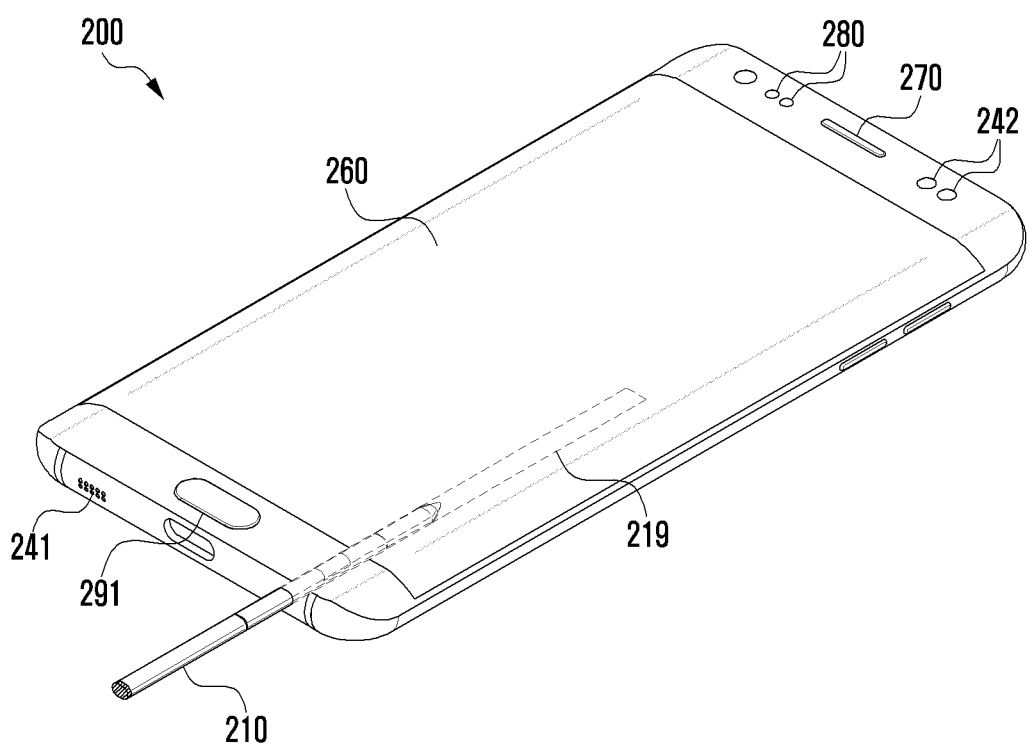
FIG. 2A is a block diagram illustrating an electronic device according to certain embodiments.

FIG. 2A is a diagram illustrating an electronic device according to certain embodiments.

The electronic device 200 (e.g., the electronic device 101 of FIG. 1) according to certain embodiments may be implemented in a portable electronic device such as a smart phone. The electronic device 200 is not limited to a specific form shown in FIG. 2A, and certain embodiments of the disclosure may be applicable to certain types of electronic devices (e.g., portable multimedia devices, portable medical devices, cameras, wearable devices, etc.).

Referring to FIG. 2A, a display 260 (e.g., the display device 160 of FIG. 1) may be disposed on the front surface of the electronic device 200. The display 260 may be a touch screen. In this case, a touch sensor may be disposed behind the display 260 or integrally provided with the display 260. On the front surface of the electronic device 200, a speaker 270, certain sensors 280, and a home button 291 may be arranged in an area (e.g., a black matrix (BM) area) other than an area where the display 260 is disposed.

According to certain embodiments, the electronic device 200 may include at least one microphone, for example, two microphones 241 and 242. Each of the microphones 241 and 242 may be exposed externally through a microphone hole opened at a specific portion (e.g., a first portion) of the housing so as to collect external sounds. As shown in FIG. 2A, the microphones 241 and 242 and may be disposed at lower and upper portions of the housing of the electronic device 200, respectively. However, the number and/or positions of microphones provided in the electronic device 200 are not limited to those of FIG. 2A.

According to certain embodiments, the speaker 270 may be exposed externally through a speaker hole. In a certain embodiment, the speaker (e.g., piezo speaker) may need no speaker hole.

According to certain embodiments, the sensors 280 may include a camera module, an illumination sensor, a proximity sensor, and/or the like. As shown, the sensors 280 may be disposed at the upper portion of the housing, but is not limited thereto.

According to certain embodiments, the electronic device 200 may execute a variety of call solutions and/or audio solutions, based on sound data received from each of the microphones 241 and 242. For example, the call solutions may include correcting sound data obtained from the microphones 241 and 242 and to be transmitted during a voice call by applying noise suppression (NS) and acoustic echo canceling (AEC) to the sound data. In addition, the audio solutions may include identifying the direction of each speaker through sound data obtained from the microphones 241 and 242 in a recording mode (or conversation mode) and then acquiring sound data for each speaker. Also, the audio solutions may include extracting and acquiring sound data of a speaker located in a specific direction.

The call solutions and/or the audio solutions are performed using a difference in energy and/or delay of signals inputted into the microphones 241 and 242, so that the accuracy is improved as the number of microphones increases. However, because the microphones 241 and 242 should be disposed in open holes of the housing, the mounting space thereof is limited.

According to certain embodiments, the electronic device 200 may include a stylus pen 210. The stylus pen 210 may be used for a touch input on the display 260 (or touch screen) of the electronic device 200. An elongated hole 219 (or a pen pocket or a recess) into which the stylus pen 210 can be inserted may be formed at a portion (e.g., a second portion) of the housing of the electronic device 200. The elongated hole 219 may have an elongated form being similar to the form of the stylus pen 210 so that the stylus pen 210 can be inserted or removed. The inlet of the elongated hole 219 may be provided at the lower portion of the housing of the electronic device 200, but is not limited thereto. Alternatively, the inlet of the elongated hole 219 may be provided at the upper or lateral portion of the housing.

A more detailed configuration of the electronic device 200 will be described later in detail with reference to FIG. 3.

Figure 2B:
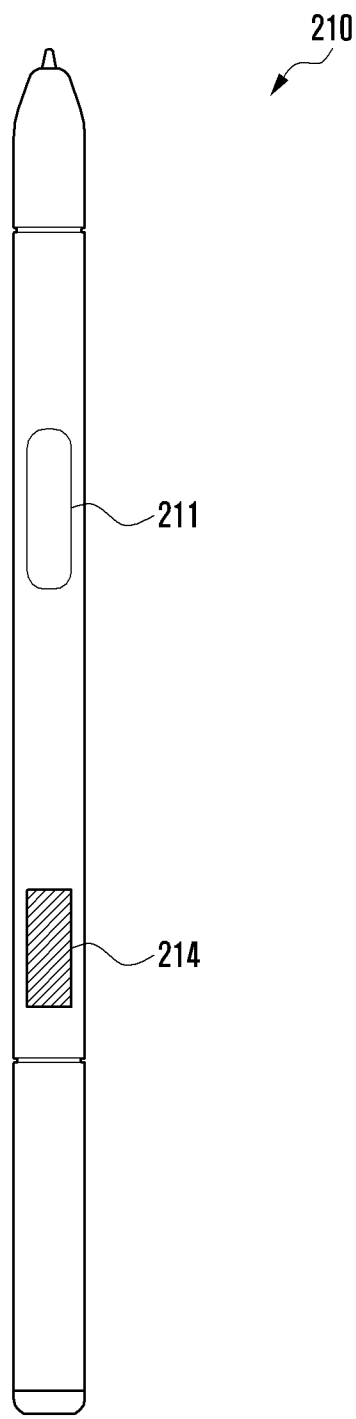
FIG. 2B is a diagram illustrating a stylus pen according to certain embodiments.

FIG. 2B is a diagram illustrating a stylus pen according to certain embodiments.

As described above, the stylus pen 210 may be inserted into the elongated hole 219 formed at the second portion of the housing of the electronic device 200 and be detachable from the electronic device 200.

As shown in FIG. 2B, the stylus pen 210 includes at least one button 211. Based on an input of the button 211, it is possible to control various operations of the stylus pen 210 (e.g., activating a hovering input, enabling wireless communication with the electronic device 200).

According to certain embodiments, the stylus pen 210 may include at least one microphone 214 (e.g., a second microphone). According to an embodiment, the microphone 214 may be disposed at a position parallel to the button 211 in the longitudinal direction of the stylus pen. According to another embodiment, the microphone 214 may be disposed at one end of the stylus pen 210 (e.g., the bottom of the stylus pen opposite to the tip of the stylus pen capable of being in contact with the touch screen) or disposed at any lateral position.

According to certain embodiments, the stylus pen 210 may transmit a sound signal, obtained through the second microphone 214, to the electronic device 200 via wireless communication or wired communication.

A more detailed configuration of the stylus pen 210 will be described later in detail with reference to FIG. 4.

Hereinafter, when an element included in the electronic device 200 and an element included in the stylus pen 210 have the same name, the former will be referred to as "first . . . ", and the latter will be referred to as "second . . . ". However, even though having the same name, the elements (e.g., a first memory and a second memory 313) of the electronic device 200 and the stylus pen 210 may be different from each other in detailed configuration and/or function.

Figure 2C:
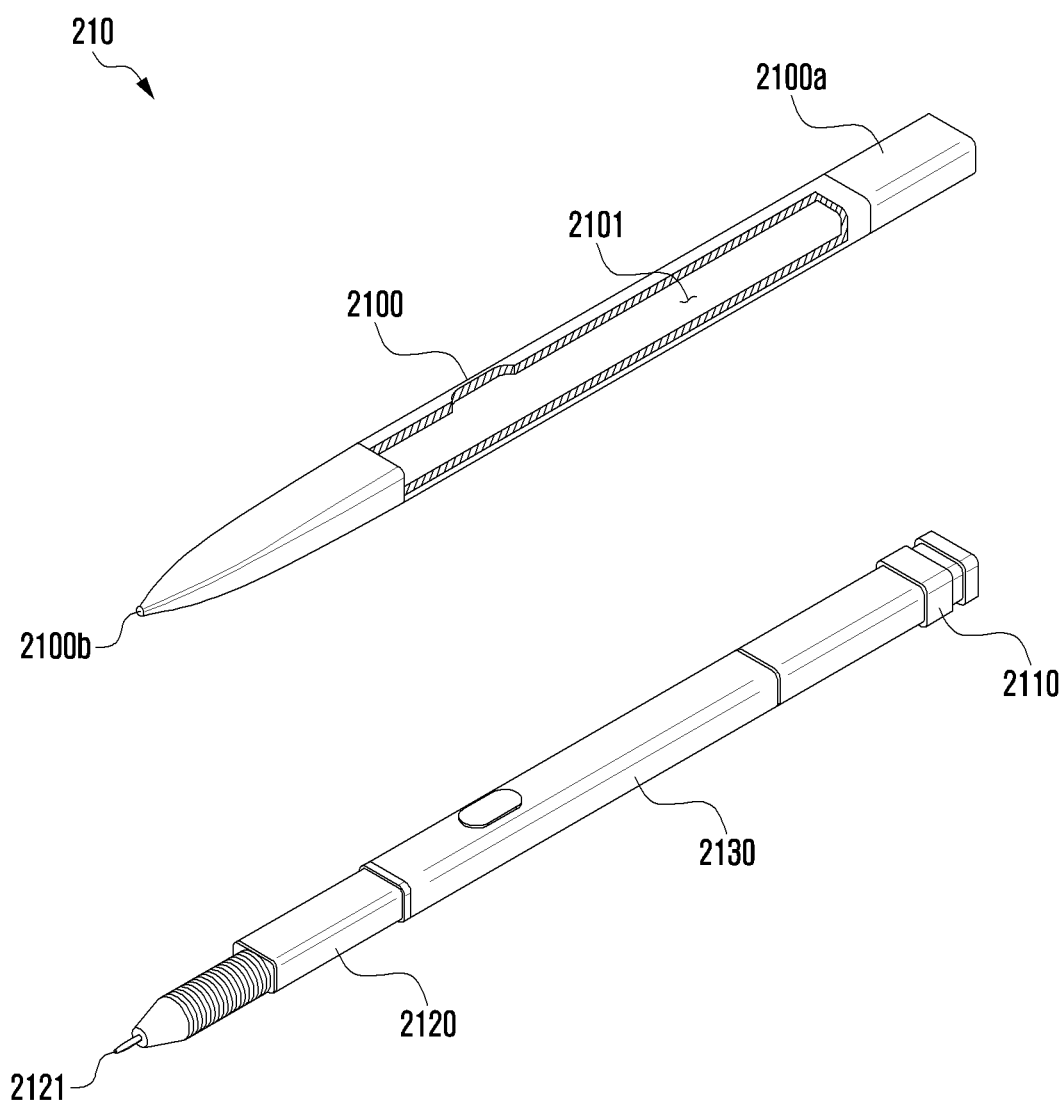
FIG. 2C and FIG. 2D are exploded perspective diagrams illustrating a stylus pen according to certain embodiments.
Figure 2D:
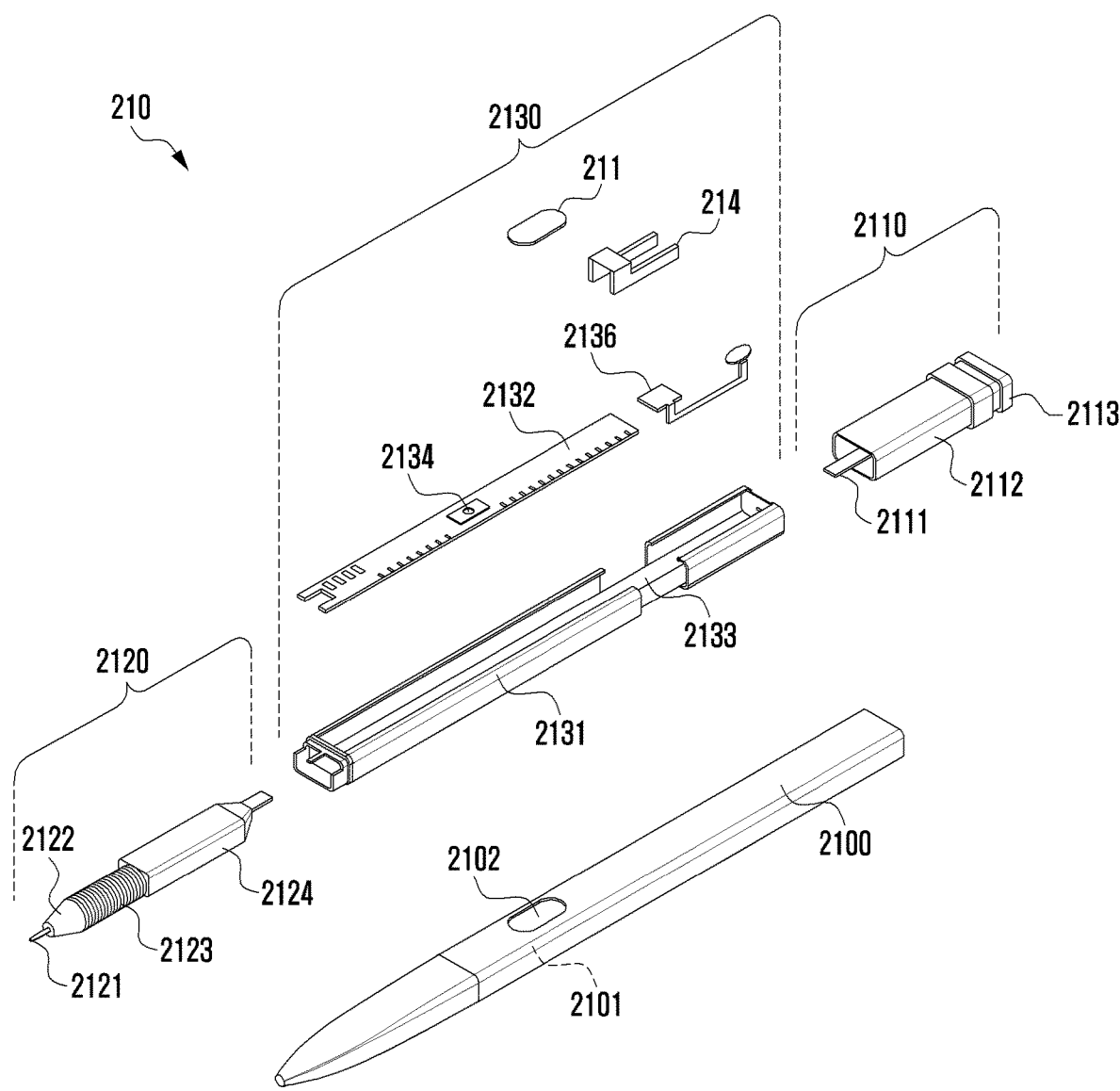

FIGS. 2C and 2D are exploded perspective diagrams illustrating a stylus pen according to certain embodiments.

Referring to FIG. 2C, the stylus pen 210 may include a pen housing 2100 forming the outer shape of the stylus pen 210 and an inner assembly enclosed with the pen housing 2100. The inner assembly may be retractable into the pen housing 2100. The inner assembly may be inserted into the pen housing 2100 in a single assembly operation to completely form the stylus pen 210.

According to certain embodiments, the pen housing 2100 has an elongated body and also includes a first end portion 2100*a* and a second end portion 2100*b* which are positioned opposite each other across the body. The second end portion 2100*b* may have a shape that becomes narrower toward the end. The pen housing 2100 may include an inner space 2101 surrounded by the body, the first end portion 2100*a*, and the second end portion 2100*b*. According to certain embodiments, at least a part of the pen housing 2100, e.g., the body, may be formed of a synthetic resin (e.g., plastic) material, and the other part of the pen housing 2100, e.g., the first end portion 2100*a*, may be formed of a metallic material (e.g., aluminum).

According to certain embodiments, the pen housing 2100 may have a cross section resembling an elliptical shape having a long, major axis and a short, minor axis, and may be formed as an elliptical pole as a whole. The elongated hole 219 of the electronic device 200 may also have an elliptical cross section corresponding to the shape of the pen housing 2100. According to certain embodiments, the shorter the minor axis of the pen housing 2100 is, the more advantageous it is to reduce the height of the elongated hole 219, that is, the overall thickness of the electronic device 200 including the elongated hole 219.

Referring further to FIG. 2D, the inner assembly may have an elongated shape corresponding to the shape of the pen housing 2100. The inner assembly may be roughly divided into three parts along the longitudinal direction. Specifically, the inner assembly may include an ejection member 2110 disposed at a position corresponding to the first end portion 2100*a* of the pen housing 2100, a circuit board part 2130 disposed at a position corresponding to the body of the pen housing, and a coil part 2120 disposed at a position corresponding to the second end portion 2100*b* of the pen housing 2100.

According to certain embodiments, the ejection member 2110 of the inner assembly may be configured to withdraw the stylus pen 210 from the elongated hole 219 of the electronic device 200. According to an embodiment, the ejection member 2110 may include a shaft 2111, an ejection body 2112 disposed around the shaft 2111 and forming the overall external shape of the ejection member 2110, and an ejection button 2113. When the inner assembly is completely inserted into the pen housing 2100, both the shaft 2111 and the ejection body 2112 are surrounded by the first end portion 2100*a* of the pen housing 2100, and the ejection button 2113 is exposed to the outside of the first end portion 2100*a*. According to certain embodiments, the ejection button 2113 may be a push button for providing a click feeling to a user or a button having a hook structure for allowing the user to pull out the stylus pen 210 by using his or her fingernails.

According to certain embodiments, the coil part 2120 of the inner assembly may include a pen tip 2121 exposed to the outside of the second end portion 2100*b* when the inner assembly is fully inserted into the pen housing 2100, a first packing ring 2122 provided for the purpose of waterproofing and dustproofing, a coil 2123 wound a plurality of times, and a pressure sensor 2124 for sensing a pressure change due to the press of the pen tip 2121. The first packing ring 2122 may be formed of epoxy, rubber, urethane, silicone, or the like. The first packing ring 2122 may protect the coil part 2120 and the circuit board part 2130 from water or dust. According to certain embodiments, the user may contact the pen tip 2121 with a display (e.g., the display 160 of FIG. 1) of the electronic device 200 and press the pen tip 2121 onto the display to conduct a user input (e.g., writing) into the electronic device 200.

According to certain embodiments, the circuit board part 2130 may include a printed circuit board (PCB) 2132 and a base 2131 surrounding at least one side of the PCB 2132.

According to an embodiment, a board supporter 2133 may be formed near an upper portion of the base 2131 to support the PCB 2132 disposed thereon, so that the PCB 1232 may be fixedly mounted on the board supporter 2133. Thus, the PCB 2132 may be protected from physical impact acting on the stylus pen 210. According to certain embodiments, a switch 2134 may be provided on the PCB 2132. The button 211 provided on the stylus pen 210 is used to press the switch 2134 and may be exposed to the outside through a lateral opening 2102 of the pen housing 2100.

According to certain embodiments, the stylus pen 210 may include a battery 2136 connected to the PCB 2132. The battery 2136 may enable the stylus pen 210 to perform an active function (e.g., BLE communication) rather than to simply operate as a writing instrument. The battery 2136 is not limited to a particular battery type, and may use certain type batteries such as a chip type battery, a cylinder type battery, or the like.

According to certain embodiments, the stylus pen 210 may include the microphone 214. The microphone 214 may be directly connected to the PCB 2132 or may be connected to a flexible printed circuit board (FPCB) (not shown) connected to the PCB 2132. As shown in FIGS. 2C and 2D, the microphone 214 is opened to the outside through a certain hole formed in the pen housing 2100 to collect external sounds. According to certain embodiments, the microphone 214 may be disposed at a position parallel to the button 211 in the longitudinal direction of the stylus pen 210.

According to certain embodiments, the ejection member 2110 shown in FIGS. 2C and 2D may be a click mechanism generating means. Specifically, when the user presses the button 211, a "click" occurs through a push-pull operation, which causes the stylus pen 210 to be removed from the electronic device 200 in an inserted state where the stylus pen 210 is inserted into the elongated hole 219 of the electronic device 200, or causes an input mode to be switched (or a pop-up function to be performed) in a detached state where the stylus pen 210 is removed from the electronic device 200. According to an embodiment, the ejection member 2110 may contain a spring to easily pull out the stylus pen 210 from the elongated hole 219 through the repulsive force of the spring.

The coil part 2120, shown in FIGS. 2C and 2D, may be an element for generating a pen input signal. According to certain embodiments, the pen tip 2121 may generate a pen coordinate signal in the form of a magnetic field, and also generate a specific resonance frequency signal based on the size and winding number of coils. According to certain embodiments, the pressure sensor 2124 may include a variable capacitor that changes capacitance in response to a pen pressure, thus changing the resonance frequency.

The circuit board part 2130, shown in FIGS. 2C and 2D, may include certain electronic components and circuits. According to an embodiment, the circuit board part 2130 may be electrically coupled to the coil part 2120. According to another embodiment, the circuit board part 2130 may be electrically coupled to the ejection member 2110 as well as the coil part 2120.

Figure 4:
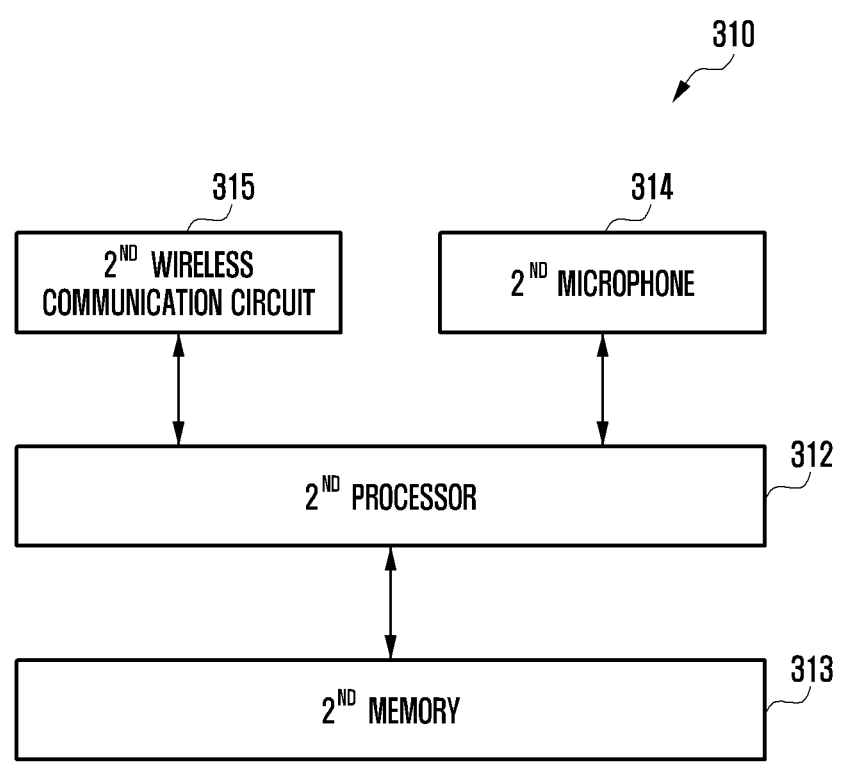
FIG. 4 is a block diagram illustrating a stylus pen according to certain embodiments.

FIG. 3 is a block diagram illustrating an electronic device according to certain embodiments, and FIG. 4 is a block diagram illustrating a stylus pen according to certain embodiments.

As shown in FIG. 3, an electronic device 300 may include a stylus pen 310, a first processor 320, a first memory 330, at least one first microphone 340, a first wireless communication circuit 350, and display 360. Even if some of components are omitted or substituted for others, certain embodiments of the disclosure may nevertheless be implemented as disclosed. The electronic device 300 may be implemented in the form of the electronic device 200 of FIG. 2A, and further include at least a part of configuration and/or function of the electronic device 101 of FIG. 1. At least some of the elements shown in FIG. 3 and/or other elements of the electronic device 300 not shown may be disposed within a housing (not shown), and at least some (e.g., the first microphone 340, a speaker) of such elements may be exposed to the outside of the housing through holes (e.g., a microphone hole, a speaker hole).

According to certain embodiments, the electronic device 300 may include at least one first microphone 340 for detecting an external sound (e.g., a user's voice). The first microphone 340 may collect analog sounds and convert them into digital sound data. To perform this function, the microphone may include an analog-to-digital converter (not shown), which may be implemented as separate hardware and/or software (e.g., software running on the first processor 320) not shown.

According to certain embodiments, the electronic device 300 may include a plurality of first microphones 340, each of which may be exposed to the outside of the device through a first portion (e.g., an upper or lower portion of the housing in FIG. 2A) of the housing of the electronic device 300. In this disclosure, the first portion refers to a region where the first microphone 340 is disposed, and does not mean only one region of the housing. The sound data obtained through the first microphones 340 may be provided to the first processor 320. Each of the first microphones 340 may be enabled or disabled by a control signal of the first processor 320, thus performing or blocking the transmission of the sound data.

According to certain embodiments, the first wireless communication circuit 350 is configured to perform wireless communication with any external device (e.g., other electronic device) and/or the stylus pen 310. The first wireless communication circuit 350 may include at least one antenna and a communication processor (CP), and further include at least a part of the configuration and/or function of the wireless communication module 192 of FIG. 1. The first wireless communication circuit 350 may communicate with a second wireless communication circuit 315 of the stylus pen 310 by using at least one of certain short-range wireless communication techniques, for example, but not limited to, a Bluetooth low energy (BLE) technique.

According to certain embodiments, the display 360 displays an image and may be formed of, but not limited to, one of a liquid crystal display (LCD), a light-emitting diode (LED) display, an organic light-emitting diode (OLED) display, a micro electro mechanical systems (MEMS) display, or an electronic paper display. The display 360 may include at least a part of the configuration and/or function of the display device 160 of FIG. 1.

According to certain embodiments, the first memory 330 may include a volatile memory and a non-volatile memory, which are well known and not limited to a specific implementation. The first memory 330 may include at least a part of the configuration and/or function of the memory 130 of FIG. 1. Also, the first memory 330 may store at least some of the programs 140 of FIG. 1.

The first memory 330 may be operatively and/or electrically coupled to the processor and may store certain instructions that are executable on the processor. Such instructions may include control commands for arithmetic and logical operations, data movement, input/output, etc., which are recognizable to the first processor 320.

According to certain embodiments, the first processor 320 may be configured to perform operating and data processing functions regarding the control and/or communication of the respective elements of the electronic device 300, and may include at least a part configuration and/or function of the processor 120 of FIG. 1. The first processor 320 may be operatively and/or electrically connected to internal elements of the electronic device 300, such as the first wireless communication circuit 350, the first microphone 340, the display 360, the first memory 330, and the like.

Although there is no limitation on operating and data processing functions that the first processor 320 may implement within the electronic device 300, embodiments to be described hereinafter will focus on identifying whether the stylus pen 310 is inserted in an elongated hole (e.g., the elongated hole 219 in FIG. 2A) of the housing, and then processing sound data obtained from the first microphone 340 and/or the second microphone 314. Operations of the first processor 320, which will be described later, may be performed by loading instructions stored in the first memory 330.

The first processor 320 may operate certain call and audio solutions, based on the sound data received from the first microphone 340 and the second microphone 314. For example, the call solutions may include correcting sound data obtained from the microphones and to be transmitted during a voice call by applying noise suppression (NS) and acoustic echo canceling (AEC) to the sound data. In addition, the audio solutions may include identifying the direction of each speaker through sound data obtained from the microphones in a recording mode (or conversation mode) and then acquiring sound data for each speaker. Also, the audio solutions may include extracting and acquiring sound data of a speaker located in a specific direction. The call solutions and/or the audio solutions may be performed using a difference in energy and/or delay of signals inputted into the microphones.

The stylus pen 310 may have the same shape and configuration as those of the stylus pen 210 of FIGS. 2B to 2D. According to certain embodiments, the stylus pen 310 includes a microphone (e.g., the second microphone 314) and may transmit sound data acquired via the second microphone 314 to the electronic device 300 through wired or wireless communication. A more detailed configuration of the stylus pen 310 will be described in more detail with reference to FIG. 4.

According to certain embodiments, the electronic device 300 may include a sensing circuit (not shown) configured to sense whether the stylus pen 310 is positioned within the elongated hole. The sensing circuit is configured to output a corresponding electrical signal when the stylus pen 310 is inserted into or removed from the elongated hole. Based the electrical signal outputted from the sensing circuit, the first processor 320 can identify whether the stylus pen 310 is located in the elongated hole.

According to certain embodiments, depending on whether the stylus pen 310 is located in the elongated hole, the first processor 320 may use at least part of the sound data obtained from at least one of the first microphone 340 and the second microphone 314 in the call/audio solutions.

According to certain embodiments, the first processor 320 may simultaneously use the first microphone 340 and the second microphone 314 while the stylus pen 310 is located in the elongated hole. When the stylus pen 310 is located in the elongated hole, the second microphone 314 is located in the second portion of the housing (e.g., the lower portion of the housing) of the electronic device 300. Therefore, the electronic device 300 may operate the call/audio solutions through the sound data obtained from three microphones in total, that is, the first microphones 340 (e.g., two) and the second microphone 314. In this case, because of being able to recognize the spatial characteristics through input signals in three directions, it is possible to improve gripping performance during a call and also realize more accurate beamforming during directional recording.

When the stylus pen 310 is not located in the elongated hole, that is, when the user is using the stylus pen 310 detached from the electronic device 300, the second microphone 314 is located apart from the electronic device 300. It is therefore undesirable to use both the first microphone 340 and the second microphone 314. In this case, the electronic device 300 uses a part of the first microphone 340 and the second microphone 314. This case may be divided into two embodiments as follows.

According to the first embodiment, the first processor 320 may use at least one first microphone 340 while the stylus pen 310 is not located in the elongated hole. That is, the electronic device 300 may operate the call/audio solutions by using the first microphone 340 mounted in the housing thereof without using the second microphone 314 separated therefrom. In this case, the first processor 320 may disable the second microphone 314 of the stylus pen 310.

According to the second embodiment, the first processor 320 may use the second microphone 314 of the stylus pen 310 while the stylus pen 310 is not located in the elongated hole. In this case, the first processor 320 may disable at least one first microphone 340 located in the housing of the electronic device 300.

Based on settings, the electronic device 300 may operate in the first or second embodiment while the stylus pen 310 is not located in the elongated hole. For this, the electronic device 300 may provide a graphical user interface (GUI) that allows the user to set up the microphone to be used when the stylus pen 310 is detached. The GUI may be selected by the user in a setting menu of a home screen or displayed on the display 360 as a pop-up menu when detachment of the stylus pen 310 is detected.

According to another embodiment, the electronic device 300 may operate in the first or second embodiment, based on a currently executing application or function. For example, in case of an application, such as a karaoke application, suitable for the user to pick up the microphone, the first processor 320 may use the second microphone 314 of the stylus pen 310 while the stylus pen 310 is not located in the elongated hole as in the second embodiment. Also, even when a voice recording application is in use, the first processor 320 may use the second microphone 314 of the stylus pen 310 while the stylus pen 310 is not located in the elongated hole as in the second embodiment.

According to certain embodiments, the electronic device 300 may supply electric power to the stylus pen 310 in a wired or wireless manner. According to an embodiment, the electronic device 300 may include a transmission coil located within the housing and forming a magnetic field for wireless charging, and the stylus pen 310 may include a reception coil for charging power in accordance with the magnetic field formed by the transmission coil. Through the transmission coil and the reception coil, the electronic device 300 may provide the power of a battery thereof to the stylus pen 310.

According to another embodiment, the electronic device 300 may include at least one terminal for supplying the power of the battery to the stylus pen 310. When the stylus pen 310 is inserted into the elongated hole of the housing, the terminal of the electronic device 300 may be in contact with a corresponding terminal of the stylus pen 310 and supply the power of the battery thereof to the battery of the stylus pen 310.

According to certain embodiments, the electronic device 300 may receive wiredly or wirelessly sound data obtained by the stylus pen 310 using the second microphone 314. According to an embodiment, the electronic device 300 is capable of receiving sound data from the second wireless communication circuit 315 of the stylus pen 310 via the first wireless communication circuit 350. The first wireless communication circuit 350 and the second wireless communication circuit 315 may communicate using at least one of a variety of short-range wireless communication techniques. For example, Bluetooth low energy (BLE) technique may be used. In case of this embodiment, even though the stylus pen 310 is placed in or detached from the housing of the electronic device 300, it is possible to transmit/receive sound data.

According to another embodiment, the electronic device 300 may include at least one first terminal protruding in the elongated hole, and the stylus pen 310 may include at least one second terminal configured to be in contact with the first terminal while being located in the elongated hole. When the first terminal and the second terminal are in contact with each other, the first processor 320 may obtain sound data from the stylus pen 310. In case of this embodiment, any element (e.g., the first wireless communication circuit 350 and the second wireless communication circuit 315) for wireless communication between the electronic device 300 and the stylus pen 310 may not be provided. In this embodiment, the stylus pen 310 may include a second memory for storing sound data obtained from the second microphone 314 and transmit the sound data stored in the second memory 313 to the first processor 320 through the first and second terminals when the stylus pen 310 is located in the elongated hole.

According to still another embodiment, the electronic device 300 may include a first coil located in the housing and a second coil located in the stylus pen, in which the first coil and the second coil (e.g., the transmission coil and the reception coil) may be used for wireless charging of the stylus pen 310. In addition, when the stylus pen 310 is inserted into the housing, the first processor 320 may receive the sound data obtained through the second microphone 314 of the stylus pen 310 by using magnetic field communication of the first and second coils.

As shown in FIG. 4, the stylus pen 310 may include a second processor 312, the second memory 313, the second microphone 314, and the second wireless communication circuit 315. Even though some of them are omitted or substituted, certain embodiments of the disclosure may be implemented. The stylus pen 310 may be formed in an elongated shape as shown in FIG. 2B, but is not limited thereto.

According to certain embodiments, the second microphone 314 may be disposed on a lateral position in a rear portion of the stylus pen 310 as in the stylus pen 210 of FIG. 2B. The configuration and/or function of the second microphone 314 may be the same as those of the first microphone 340.

According to certain embodiments, the second wireless communication circuit 315 is configured to communicate with the first wireless communication circuit 350 of the electronic device 300, and may support the same short-range wireless communication technique (e.g., BLE) as in the first wireless communication circuit 350. According to an embodiment, the stylus pen 310 may transmit sound data obtained by the second microphone 314 to the electronic device 300 via wireless communication. In this case, the sound data may be transmitted to the first wireless communication circuit 350 via the second wireless communication circuit 315.

According to certain embodiments, the second memory 313 may store sound data obtained by the second microphone 314. According to an embodiment, the stylus pen 310 may transmit the sound data to the electronic device 300 via wired communication. In case of sound data obtained while the stylus pen 310 is detached from the elongated hole (e.g., 219 of FIG. 2A) of the electronic device 300, the stylus pen 310 may store the obtained sound data in the second memory 313 and then, when being inserted into the elongated hole, provide the stored sound data to the electronic device 300 through the connection of the first and second terminals.

According to certain embodiments, the second processor 312 performs certain functions of controlling the respective elements of the stylus pen 310. For example, the second processor 312 may perform a function of storing sound data, obtained by the second microphone 314, in the second memory 313 or providing the sound data to the electronic device 300.

The stylus pen 310 according to certain embodiments is not limited to the configuration shown in FIG. 4. For example, the stylus pen 310 may not have a separate processor such as the second processor 312. In addition, the second memory 313 may be omitted when the stylus pen 310 is configured to transmit sound data to the electronic device 300 via wireless communication. Also, the second wireless communication circuit 315 may be omitted when the stylus pen 310 is configured to transmit sound data to the electronic device 300 via wired communication.

Figure 5A:
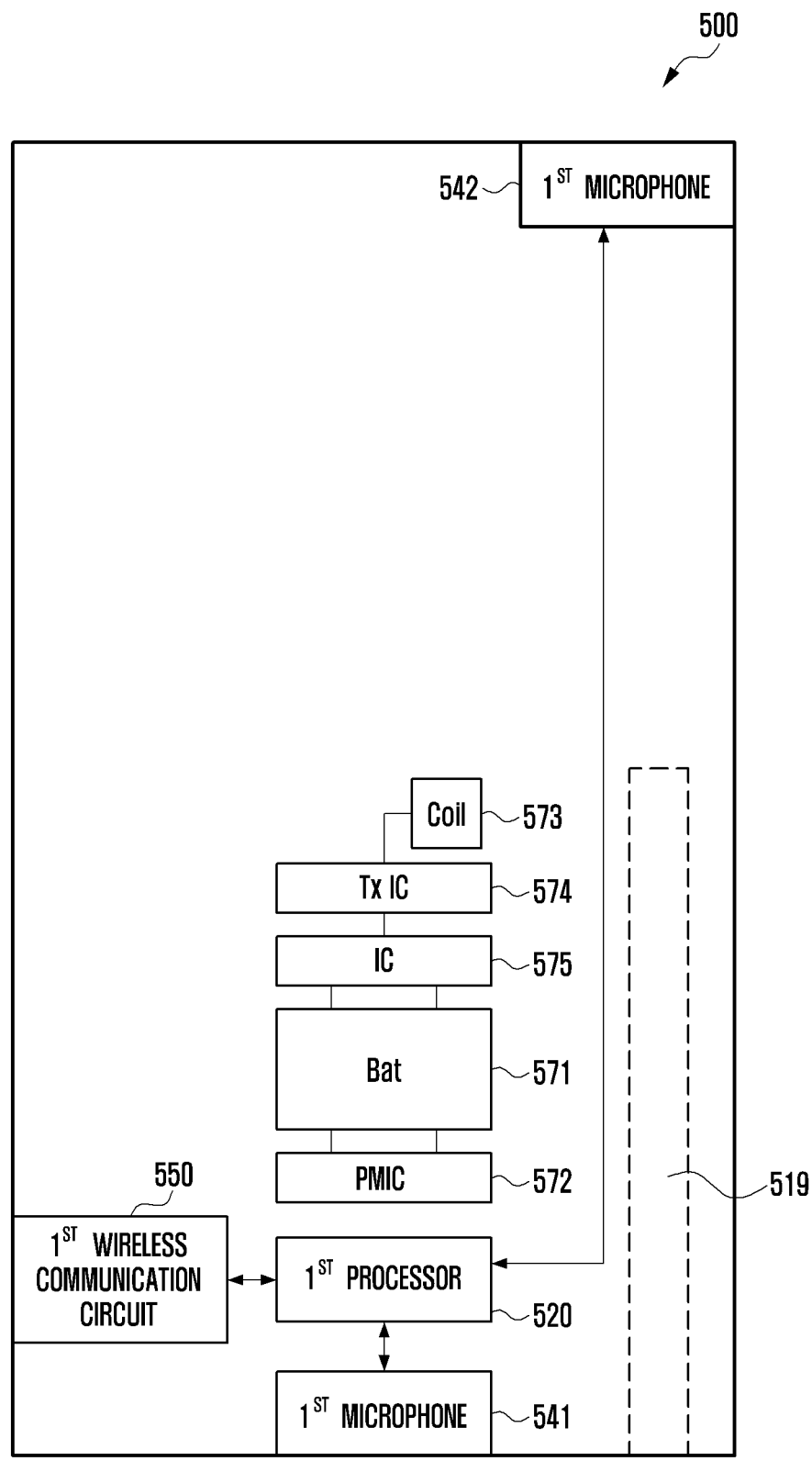
FIG. 5A is a block diagram illustrating an electronic device according to certain embodiments.
Figure 5B:
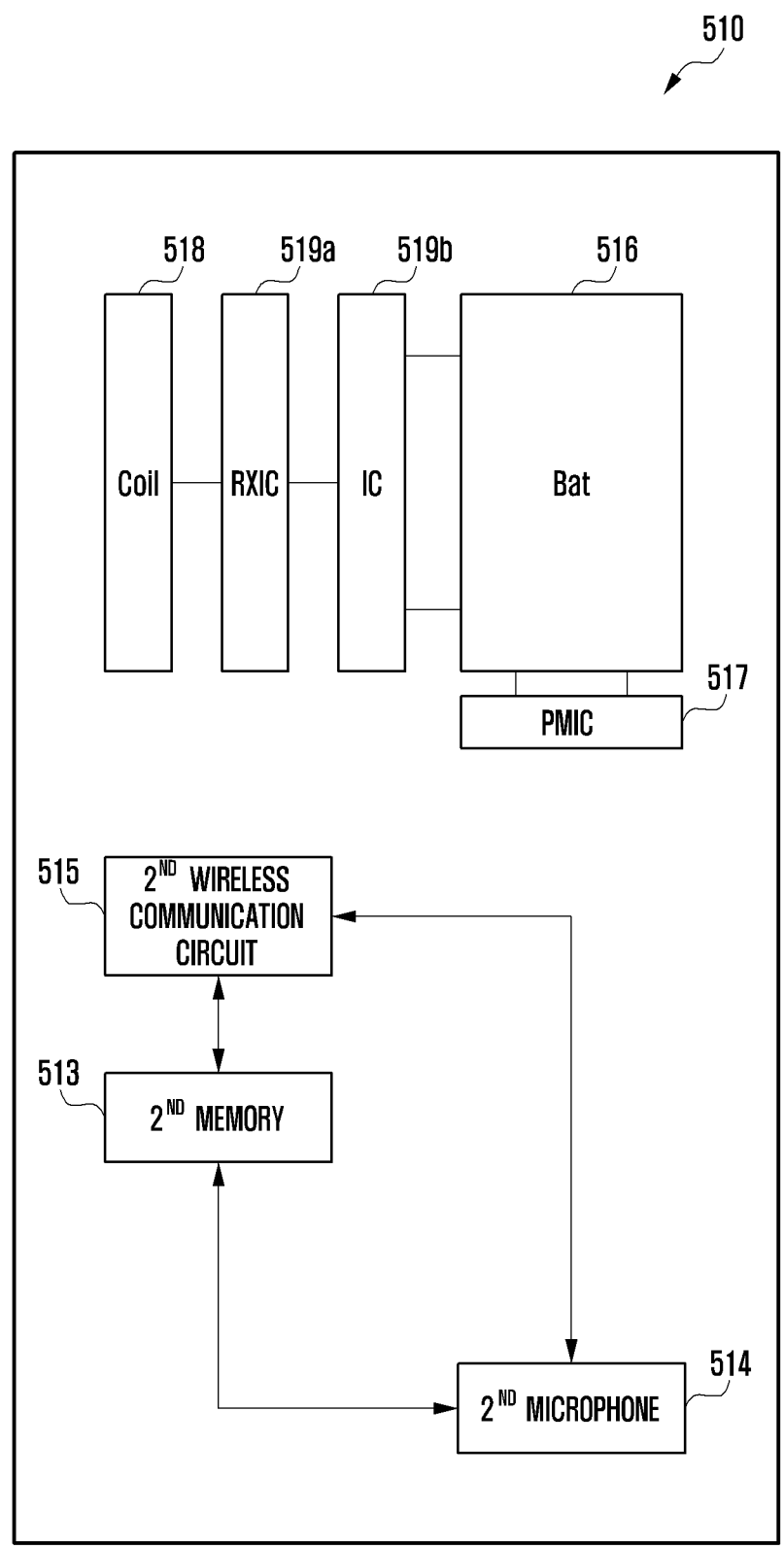
FIG. 5B is a block diagram illustrating a stylus pen according to certain embodiments.

FIG. 5A is a block diagram illustrating an electronic device according to certain embodiments, and FIG. 5B is a block diagram illustrating a stylus pen according to certain embodiments.

According to certain embodiments, an electronic device 500 (e.g., the electronic device 300 of FIG. 3) may provide power to a stylus pen 510 (e.g., the stylus pen 310 of FIG. 3) through wireless charging. FIGS. 5A and 5B relate to an embodiment for supplying power to the stylus pen 510 through wireless charging. In addition, FIGS. 5A and 5B, together with FIGS. 6A and 6B to be described below, relate to embodiments in which the electronic device 500 or 600 and the stylus pen 510 or 610 transmit and receive sound data through wireless communication.

According to certain embodiments, the electronic device 500 may include a transmission coil 573 (or a first coil) that is located within the housing and forms a magnetic field for wireless charging.

Referring to FIG. 5A, the electronic device 500 may include a battery 571 for supplying power, and a power management integrated circuit (PMIC) 572 for controlling charging and power supplying processes of the battery 571. A Tx IC 574 may supply a current to the transmission coil 573 to form a magnetic field in the transmission coil 573. An IC 575 may supply power of the battery 571 to the Tx IC 574. The IC 575 and/or the Tx IC 574 may be omitted.

A first processor 520 (e.g., the first processor 320 of FIG. 3) may transmit a control signal for battery charging of the stylus pen 510 to the PMIC 572 automatically. Alternatively, charging may be initiated in response to a user's selection when the stylus pen 510 is inserted into an elongated hole 519 of the housing.

The respective elements of the electronic device 500 (e.g., first microphones 541 as in FIG. 5B and 542 such as the first microphone 340 of FIG. 3, the first processor 520, a first wireless communication circuit 550 such as the first wireless communication circuit 350 of FIG. 3) may operate by receiving power from the battery 571. These elements have the substantially same configurations and/or functions as those of FIG. 3, so that the descriptions thereof will be omitted here.

Referring to FIG. 5B, the stylus pen 510 may include a reception coil 518 (or a second coil) for charging power in accordance with the magnetic field formed by the transmission coil 573 of the electronic device 500. When the transmission coil 573 forms the magnetic field, a current is created in the reception coil 518 and is then transferred to the battery 516 through an Rx IC 519a and an IC 519b. Therefore, the battery 516 is charged. At this time, a PMIC 517 may control the battery charging.

According to certain embodiments, when the stylus pen 510 is inserted into the housing, the first processor 520 may receive sound data obtained through a second microphone 514 of the stylus pen 510 by using magnetic field communication between the transmission coil 573 and the reception coil 518.

The respective elements of the stylus pen 510 (e.g., the second microphone 514, a second memory 513, a second wireless communication circuit 515) may operate by receiving power from the battery 516. These elements have the substantially same configurations and/or functions as those of FIG. 4, so that the descriptions thereof will be omitted here.

Figure 6A:
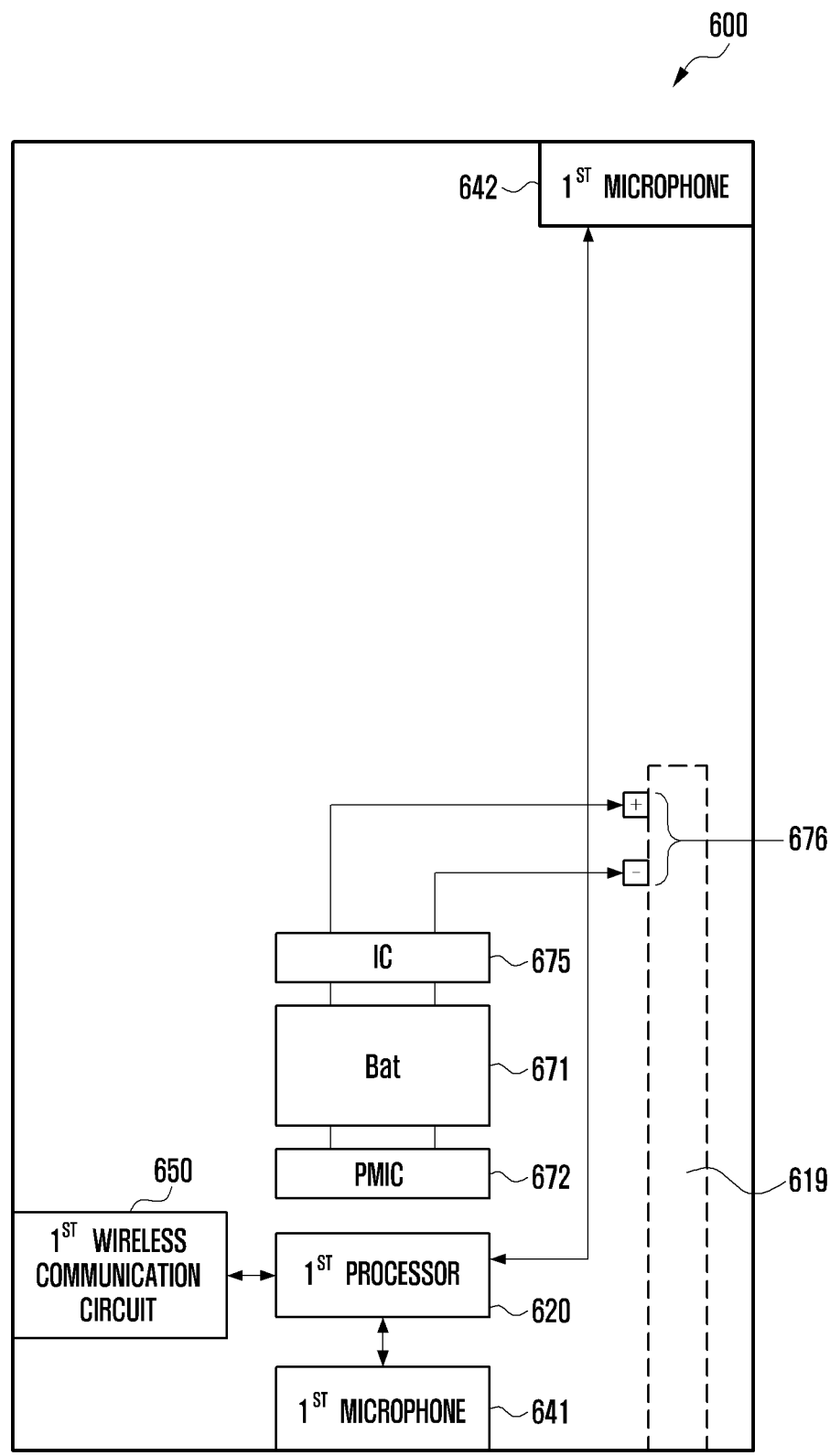
FIG. 6A is a block diagram illustrating an electronic device according to certain embodiments.
Figure 6B:
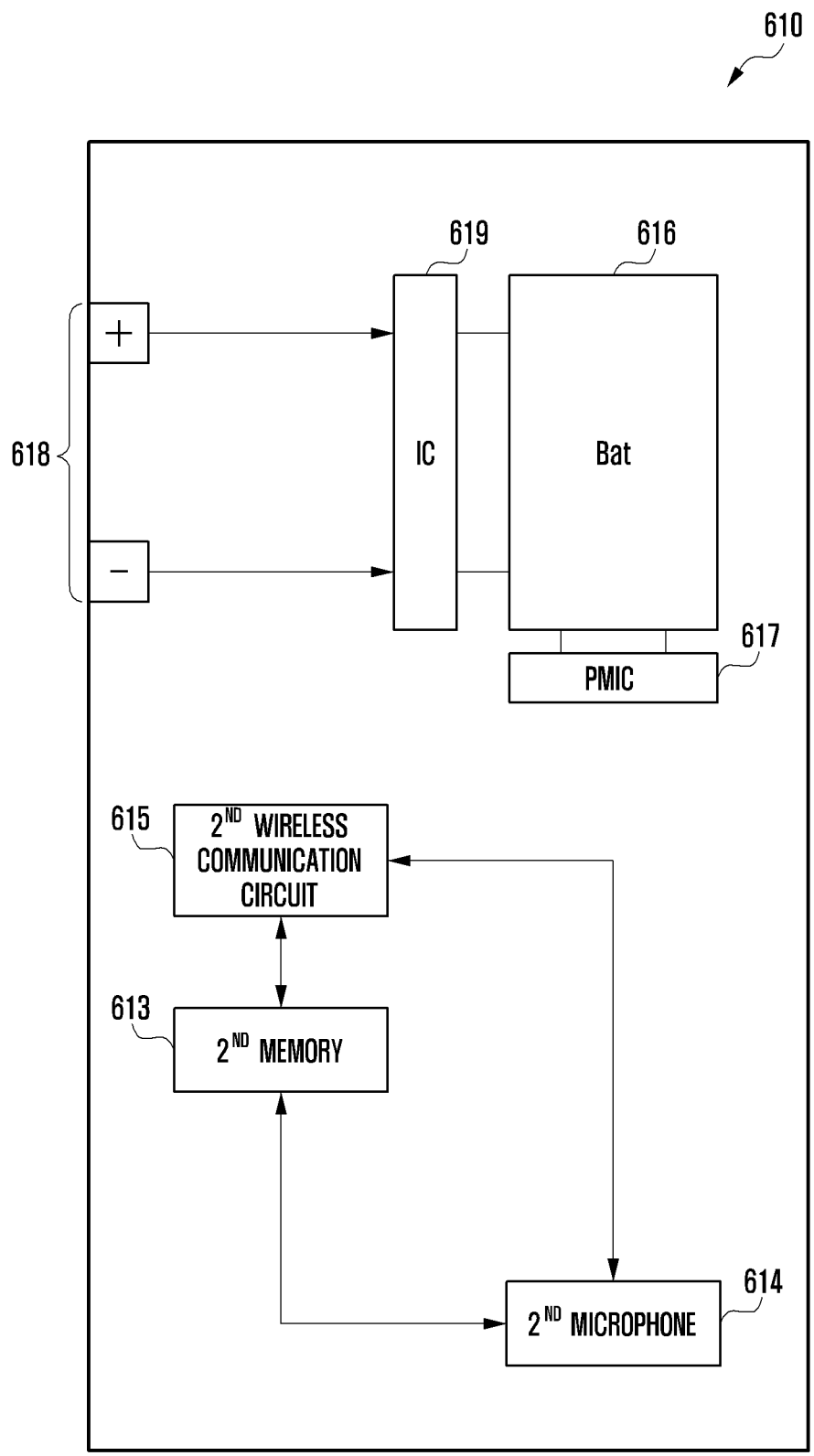
FIG. 6B is a block diagram illustrating a stylus pen according to certain embodiments.

FIG. 6A is a block diagram illustrating an electronic device according to certain embodiments, and FIG. 6B is a block diagram illustrating a stylus pen according to certain embodiments.

According to certain embodiments, each of an electronic device 600 (e.g., the electronic device 300 of FIG. 3) and a stylus pen 610 (e.g., the stylus pen 310 of FIG. 3) may include at least one terminal 676 or 618 to be used for supplying power from a battery 671 of the electronic device 600 to the stylus pen 610. FIGS. 6A and 6B relate to an embodiment for supplying power to the stylus pen 610 through a wired charging technique.

According to certain embodiments, the electronic device 600 may include at least one terminal 676 for supplying power to the stylus pen 610, and the stylus pen 610 may include at least one terminal 618 (as seen in FIG. 6B) corresponding to the at least one terminal 676 of the electronic device 600.

Referring to FIG. 6A, the electronic device 600 may include the battery 671 for supplying power, and a power management integrated circuit (PMIC) 672 for controlling the battery 671. Positive (+) and negative (−) terminals 676 are disposed to be in contact with corresponding terminals 618 of the stylus pen 610 when the stylus pen 610 is inserted into an elongated hole 619. The power of the battery 671 may be provided to the terminals 676 through an IC 675. The electronic device further includes a first communication circuit 650 and first microphone 641.

A first processor 620 may transmit a control signal for battery charging of the stylus pen 610 to the PMIC 672 automatically or in response to a user's selection when the stylus pen 610 is inserted into the elongated hole 619 of the housing.

Referring to FIG. 6B, the stylus pen 610 may include positive (+) and negative (−) terminals 618 disposed to be in contact with the terminals 676 of the electronic device 600 when the stylus pen 610 is inserted into the elongated hole 619 of the electronic device 600. A current flowing into the terminals 618 is transferred to a battery 616 through an IC 675, so that the battery 616 can be charged. Further illustrated are the PMIC 617, the second wireless communication circuit 615, the second memory 613, and the second microphone 614.

Figure 7A:
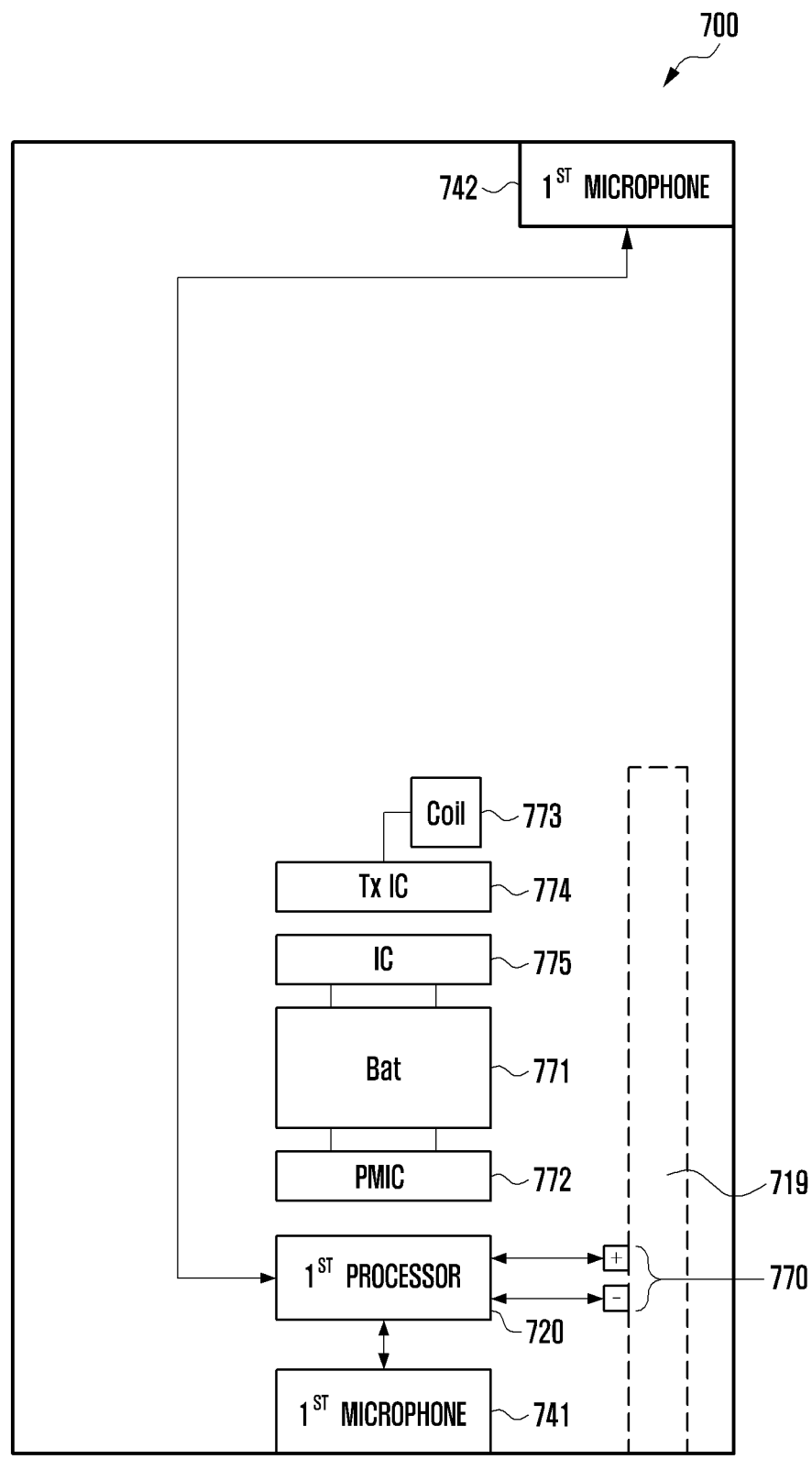
FIG. 7A is a block diagram illustrating an electronic device according to certain embodiments.
Figure 7B:
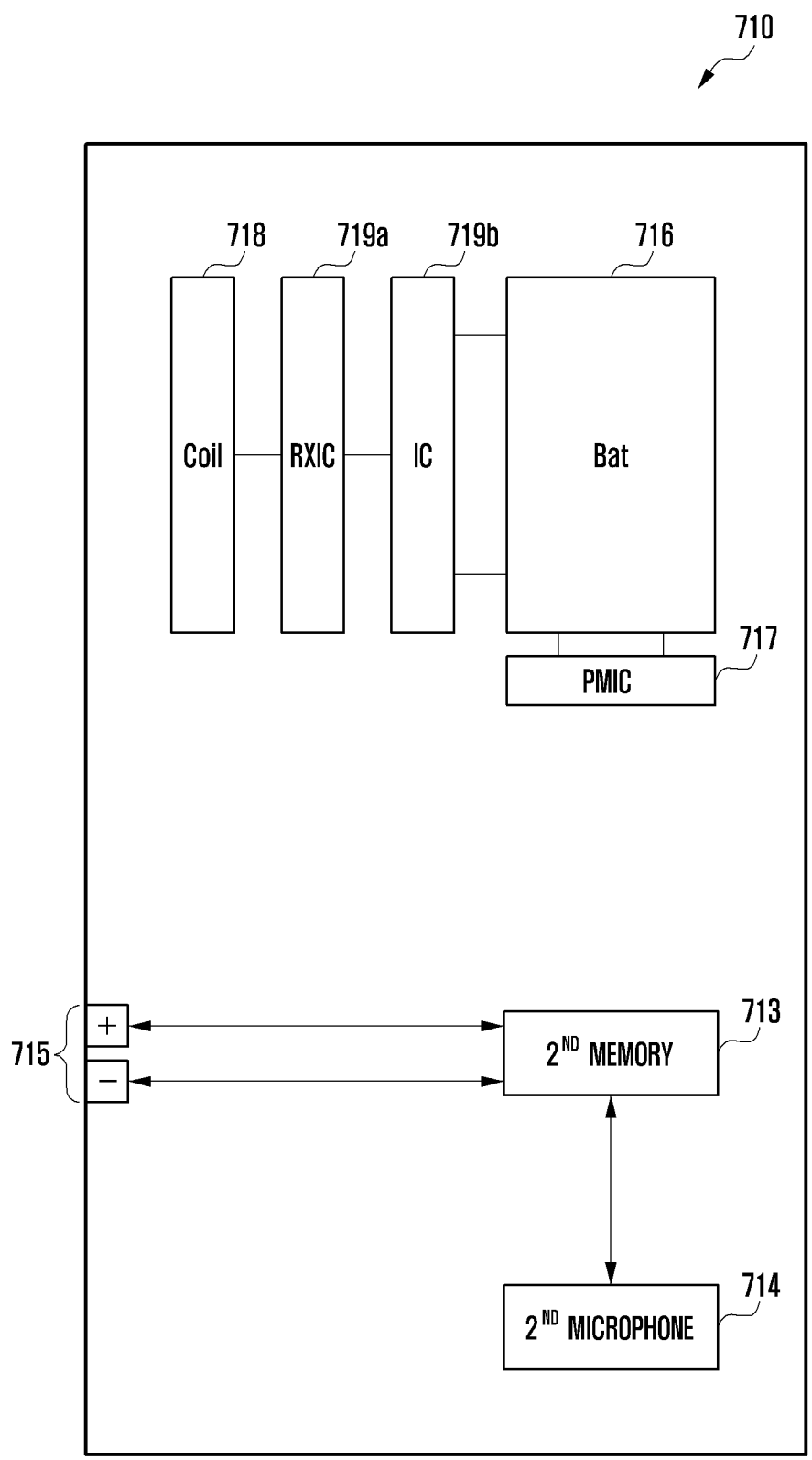
FIG. 7B is a block diagram illustrating a stylus pen according to certain embodiments.

FIG. 7A is a block diagram illustrating an electronic device according to certain embodiments, and FIG. 7B is a block diagram illustrating a stylus pen according to certain embodiments.

According to certain embodiments, each of an electronic device 700 (e.g., the electronic device 300 of FIG. 3) and a stylus pen 710 (e.g., the stylus pen 310 of FIG. 3) may include at least one terminal 770 (and/or 715 as in FIG. 7B) to be used for transmitting sound data obtained by the stylus pen 710 to a certain element (e.g., a first processor 720) of the electronic device 700.

According to certain embodiments, the electronic device 700 may include at least one first terminal 770 protruding in an elongated hole 719, and the stylus pen 710 may include at least one second terminal 715 disposed to be in contact with the first terminal 770 while being located in the elongated hole 719.

When the stylus pen 710 is located in the elongated hole 719, the first terminal 770 and the second terminal 715 are in contact with each other. Thus, sound data stored in a second memory 713 may be provided to the first processor 720 (e.g., the first processor 320 of FIG. 3) via data transmitted through the first terminal 770 and the second terminal 715.

In this embodiment, the electronic device 700 and the stylus pen 710 may not be equipped with any elements for wireless communication (e.g., the first wireless communication circuit 550 of FIG. 5A and the second wireless communication circuit 515 of FIG. 5B), and transmit sound data instead via wired communication. When the user inputs sound data to a second microphone 714 in a state where the stylus pen 710 is detached from the elongated hole 719 of the electronic device 700, the sound data is stored in the second memory 713 (e.g., the second memory 313 of FIG. 4). Then, when the stylus pen 710 is inserted into the elongated hole 719 of the electronic device 700, the sound data stored in the second memory 713 may be provided to the first processor 720 through the first and second terminals 770 and 715. Further shown in FIG. 7A are the first microphone 742, coil 773, transmission IC 774, IC 775, battery 771, PMIC 772, first microphone 741, and compartment 719 for stowing the stylus. Further shown in FIG. 7B are the coil 718, reception IC 719a, IC 719b, battery 716, and PMIC 717.

Figure 8A:
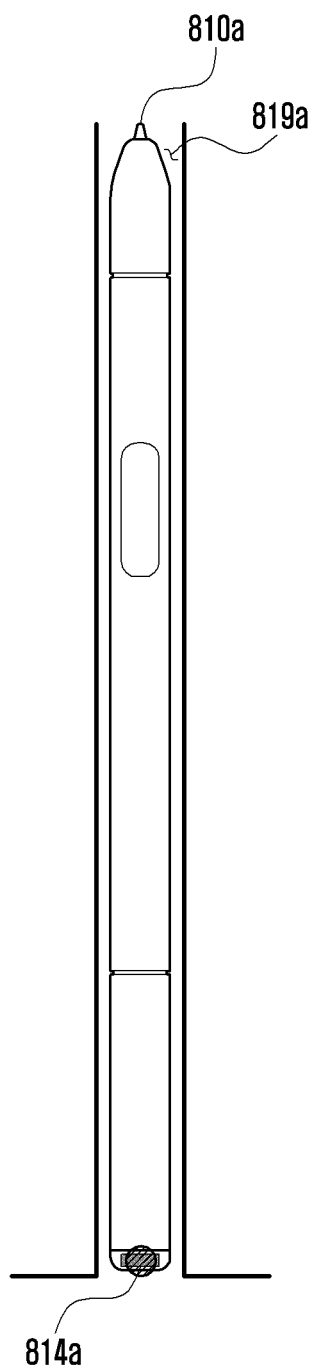
FIG. 8A and FIG. 8B are diagrams illustrating the arrangement of a microphone of a stylus pen and an elongated hole of an electronic device according to certain embodiments.
Figure 8B:
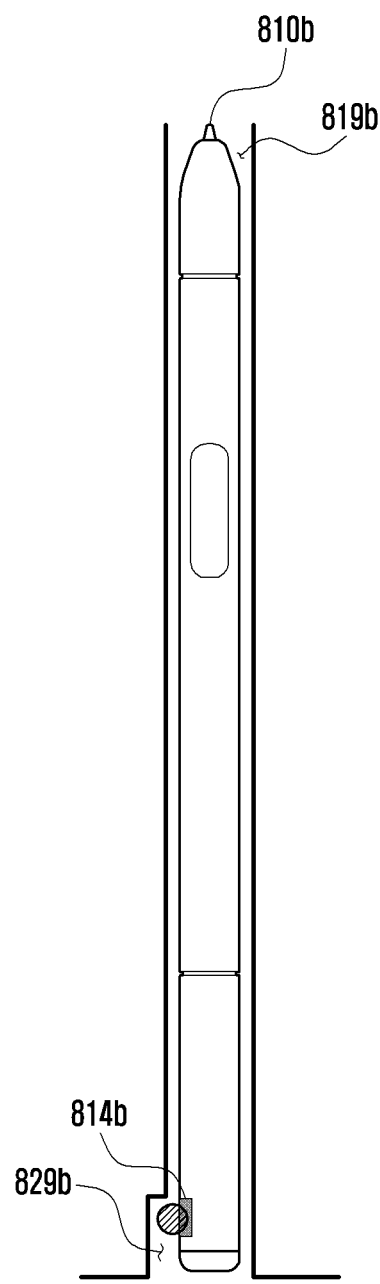

FIGS. 8A and 8B are diagrams illustrating the arrangement of a microphone of a stylus pen and an elongated hole of an electronic device according to certain embodiments.

In order for the microphone to collect external sounds, a part of the microphone should be exposed to the outside. The electronic device according to certain embodiments includes a second microphone in the stylus pen, and the second microphone is often used even when the stylus pen is inserted into the elongated hole of the electronic device. Therefore, the second microphone is exposed to the outside even in a state where the stylus pen is inserted.

As shown in FIG. 8A, a second microphone 814a may be disposed at a lower end portion of a stylus pen 810a. Therefore, even when the stylus pen 810a is inserted into an elongated hole 819a of the electronic device, the second microphone 814a may be exposed to the outside.

As shown in FIG. 8B, a second microphone 814*b* may be disposed at a lower lateral portion of a stylus pen 810*b*. In the FIG. 8A embodiment, the second microphone 814*a* is directly exposed to the outside of the housing of the electronic device, so that it may be vulnerable to foreign matter inflow and physical shock. In contrast, this problem is prevented or mitigated in case of the embodiment seen in FIG. 8B. According to certain embodiments, the stylus pen 810*b* may include at least one button, and the second microphone 814*b* may be disposed at a position parallel to the button in the longitudinal direction of the stylus pen 810*b*. When using the stylus pen 810*b*, the user mostly holds the stylus pen 810*b* with the button facing upward. Therefore, when the second microphone 814*b* is located in a direction parallel to the button, it is easy to secure a user's voice through the second microphone 814*b*.

In this embodiment, because the second microphone 814*b* is located on the side, a space 829*b* for a sound collecting path of the second microphone 814*b* may be formed in a part of the housing of the electronic device.

FIG. 9 is a diagram illustrating characteristics of sound outputted depending on whether a stylus pen is attached or detached according to certain embodiments of the electronic device 900.

According to certain embodiments, a first processor (e.g., the first processor 320 of FIG. 3) may use at least one first parameter for processing sound data received from first and second microphones while the stylus pen is located within the elongated hole. In addition, the first processor may use at least one second parameter for processing sound data received from the first microphone while the stylus pen is not located in the elongated hole. The first and second parameters may be different from each other.

The functions of an electronic device using the first microphone and the second microphone include camcording, voice calling, recording karaoke, etc. and each function might require optimization based on the number of used microphones, the mutual position of each microphone, and the characteristics of the signal received by each microphone.

When the stylus pen is located inside the home, there is a change in the characteristics of the usable microphones of the electronic device (ex. number, position, signal, etc.) compared to when the stylus pen is removed and therefore, a separately optimized parameter might be required.

According to the various embodiments, the first parameter and the second parameter for processing the sound data can be a channel separating (ex. stereo and mono) and beamforming parameter when recording, a parameter used for normalizing or zooming the voices between a subject and capturer when camcording, and an echo canceller parameter for changes in the echo characteristics when calling.

In detail, the parameter can be configured to support stereo recording or the separating function for the speaker when the stylus pen is inserted inside the electronic device and the parameter can be configured to support mono recording by only using the first microphone when the stylus pen is removed.

In addition, the parameter can be configured to use the volume normalizing function of the volume when the first microphone and the second microphone are positioned in a front to back direction. If the volume normalizing function is not used, the capturer's voice will be loud and when the volume normalizing function is used, the voices of the capturer and the subject will be adjusted appropriately.

Furthermore, because there is a change in the echo characteristic due to the distance between the speaker and the microphone, when the stylus pen is inserted inside the home, the signal inputs of the first microphone and the second microphone are compared and the microphones can be changed to facilitate the signal processing. In this situation, the noise suppression parameter can be separated and applied based on the number of used microphones.

As shown in FIG. 9, when a stylus pen 910*a* is located in an elongated hole 919*a*, there is little free space in the elongated hole, resulting in a particular characteristic in output path and vibration characteristic for sound generated by speakers 971*a* and 972*b*. However, when a stylus pen 910*b* is detached from an elongated hole 919*b*, the entire space in the elongated hole 919*b* becomes empty. This empty space causes a change in an output path and vibration characteristics of sound outputted from speakers 971*b* and 972*b*, so that a problem arises in that echo performance deteriorates, and audio characteristics are distorted. Therefore, the first processor processes sound data by using different parameters depending on whether the stylus pen is located in the elongated hole, or where the stylus pen is not located in the elongated hole, so that the sound data obtained in the first and second cases and/or the sound data outputted to the user may have a certain degree of consistency (e.g., may have the substantially same audio characteristics).

According to certain embodiments, an electronic device 300 includes a housing, at least one first microphone 340 disposed within the housing and exposed through a first portion of the housing, a first wireless communication circuit 350 disposed within the housing, an elongated hole formed in a second portion of the housing, a stylus pen 310 detachably inserted into the elongated hole and including a second microphone 314, a processor (e.g., the first processor 320 of FIG. 3) disposed within the housing and functionally connected to the at least one first microphone 340 and the first wireless communication circuit 350, and a memory disposed within the housing and functionally connected to the processor. The memory may store instructions that cause, when executed, the processor to simultaneously use both the at least one first microphone 340 and the second microphone 314 when the stylus pen 310 is located in the elongated hole, and to use the at least one first microphone 340 when the stylus pen 310 is not located in the elongated hole.

According to certain embodiments, the electronic device may further include a sensing circuit configured to sense whether the stylus pen 310 is located in the elongated hole, and the instructions may cause the processor to receive a signal from the sensing circuit.

According to certain embodiments, the stylus pen 310 may further include a second wireless communication circuit 315, and the instructions may cause the processor to receive sound data by using the first wireless communication circuit 350 and the second wireless communication circuit 315.

According to certain embodiments, each of the first wireless communication circuit 350 and the second wireless communication circuit 315 may be configured to support a Bluetooth low energy (BLE) technique.

According to certain embodiments, the housing may include at least one first terminal protruding in the elongated hole, and the stylus pen 310 may include at least one second terminal configured to be in contact with the first terminal while being located in the elongated hole. The instructions may cause the processor to receive sound data through the first terminal and the second terminal.

According to certain embodiments, the instructions cause the processor to disable the second microphone 314 while the stylus pen 310 is not located in the elongated hole.

According to certain embodiments, the instructions may cause the processor to use at least one first parameter for processing sound data received from the first and second microphones 340 and 314 while the stylus pen 310 is located in the elongated hole, and to use at least one second parameter, being different from the first parameter, for processing sound data received from the first microphone 340 while the stylus pen 310 is not located in the elongated hole.

According to certain embodiments, the electronic device may further include a transmission coil disposed within the housing and forming a magnetic field for wireless charging, and the stylus pen 310 may further include a reception coil for charging power in accordance with the magnetic field formed by the transmission coil.

According to certain embodiments, the stylus pen 310 may further include at least one button, and the second microphone may be disposed at a position parallel to the at least one button in a longitudinal direction of the stylus pen 310.

According to certain embodiments, an electronic device 300 includes a housing, at least one first microphone 340 disposed within the housing and exposed through a first portion of the housing, a first wireless communication circuit 350 disposed within the housing, an elongated hole formed in a second portion of the housing, a stylus pen 310 detachably inserted into the elongated hole and including a second microphone 314, a processor (e.g., the first processor 320 of FIG. 3) disposed within the housing and functionally connected to the at least one first microphone 340 and the first wireless communication circuit 350, and a memory disposed within the housing and functionally connected to the processor. The memory may store instructions that cause, when executed, the processor to simultaneously use both the at least one first microphone 340 and the second microphone 314 when the stylus pen 310 is located in the elongated hole, and to use the second microphone 314 when the stylus pen 310 is not located in the elongated hole.

According to certain embodiments, the electronic device may further include a sensing circuit configured to sense whether the stylus pen 310 is located in the elongated hole, and the instructions may cause the processor to receive a signal from the sensing circuit.

According to certain embodiments, the stylus pen 310 may further includes a second wireless communication circuit 315, and the instructions may cause the processor to receive sound data by using the first wireless communication circuit 350 and the second wireless communication circuit 315.

According to certain embodiments, each of the first wireless communication circuit 350 and the second wireless communication circuit 315 may be configured to support a Bluetooth low energy (BLE) technique.

According to certain embodiments, the housing may include at least one first terminal protruding in the elongated hole, and the stylus pen 310 may include at least one second terminal configured to be in contact with the first terminal while being located in the elongated hole. The instructions may cause the processor to receive sound data through the first terminal and the second terminal.

According to certain embodiments, the electronic device may further include a first coil disposed within the housing, and a second coil disposed in the stylus pen, in which the instructions may cause the processor to receive sound data through the first coil and the second coil.

According to certain embodiments, the instructions may cause the processor to disable the at least one first microphone 340 while the stylus pen 310 is not located in the elongated hole.

According to certain embodiments, the instructions may cause the processor to use at least one first parameter for processing sound data received from the first and second microphones 340 and 314 while the stylus pen 310 is located in the elongated hole, and to use at least one second parameter, being different from the first parameter, for processing sound data received from the second microphone 314 while the stylus pen 310 is not located in the elongated hole.

Figure 10:
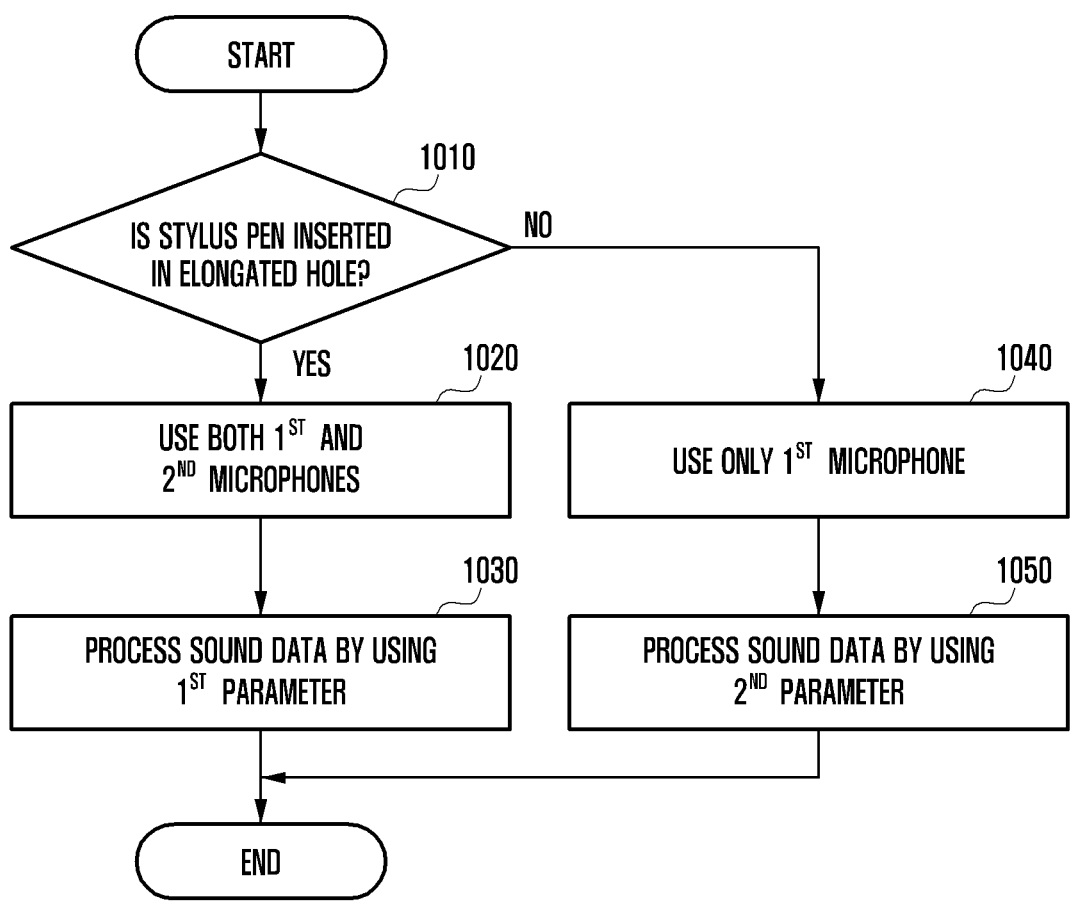
FIG. 10 is a flow diagram illustrating a method for controlling a microphone of an electronic device according to certain embodiments.

FIG. 10 is a flow diagram illustrating a method for controlling a microphone of an electronic device according to certain embodiments.

The illustrated method may be performed by the electronic device described above with reference to FIGS. 3 to 9, and the above-described technical features will be not described repeatedly.

At operation 1010, the electronic device (e.g., the electronic device 300 of FIG. 3, especially, the first processor 320) may determine whether the stylus pen (e.g., the stylus pen 310 of FIG. 3) is inserted in the elongated hole. For example, the electronic device may include a sensing circuit configured to sense whether the stylus pen is located within the elongated hole. The sensing circuit is configured to output a corresponding electrical signal when the stylus pen is inserted into or removed from the elongated hole. Based the electrical signal outputted from the sensing circuit, the first processor can identify whether the stylus pen is located in the elongated hole.

When it is determined at operation 1010 that the stylus pen is inserted in the elongated hole, the electronic device (e.g., the first processor 320 of FIG. 3) may simultaneously use at operation 1020 both a first microphone (e.g., the first microphone 340 of FIG. 3) and a second microphone (e.g., the second microphone 314 of FIG. 4). When the stylus pen is located in the elongated hole, the second microphone is located in a second portion of the housing (e.g., a lower portion of the housing) of the electronic device. Therefore, the electronic device may operate call/audio solutions through sound data obtained from three microphones in total, that is, the first microphones (e.g., two) and the second microphone. In this case, because of the ability to recognize the spatial characteristics through input signals in three directions, it is possible to improve gripping performance during a call and also realize more accurate beamforming during directional recording.

Then, at operation 1030, the electronic device may process the sound data by using a first parameter. Here, the first parameter may include at least one parameter that is set to be used for processing the sound data when the stylus pen is inserted into the electronic device. The operations 1020 and 1030 may be reversed in order thereof or performed at the same time at least in part.

When it is determined at operation 1010 that the stylus pen is not inserted in the elongated hole, the electronic device may use at operation 1040 the first microphone and exclude the second microphone. In this case, the electronic device may disable the second microphone of the stylus pen.

Then, at operation 1050, the electronic device may process the sound data by using a second parameter. Here, the second parameter may include at least one parameter that is set to be used for processing the sound data when the stylus pen is detached from the electronic device. The operations 1040 and 1050 may be reversed in order thereof or performed at the same time at least in part.

Figure 11:
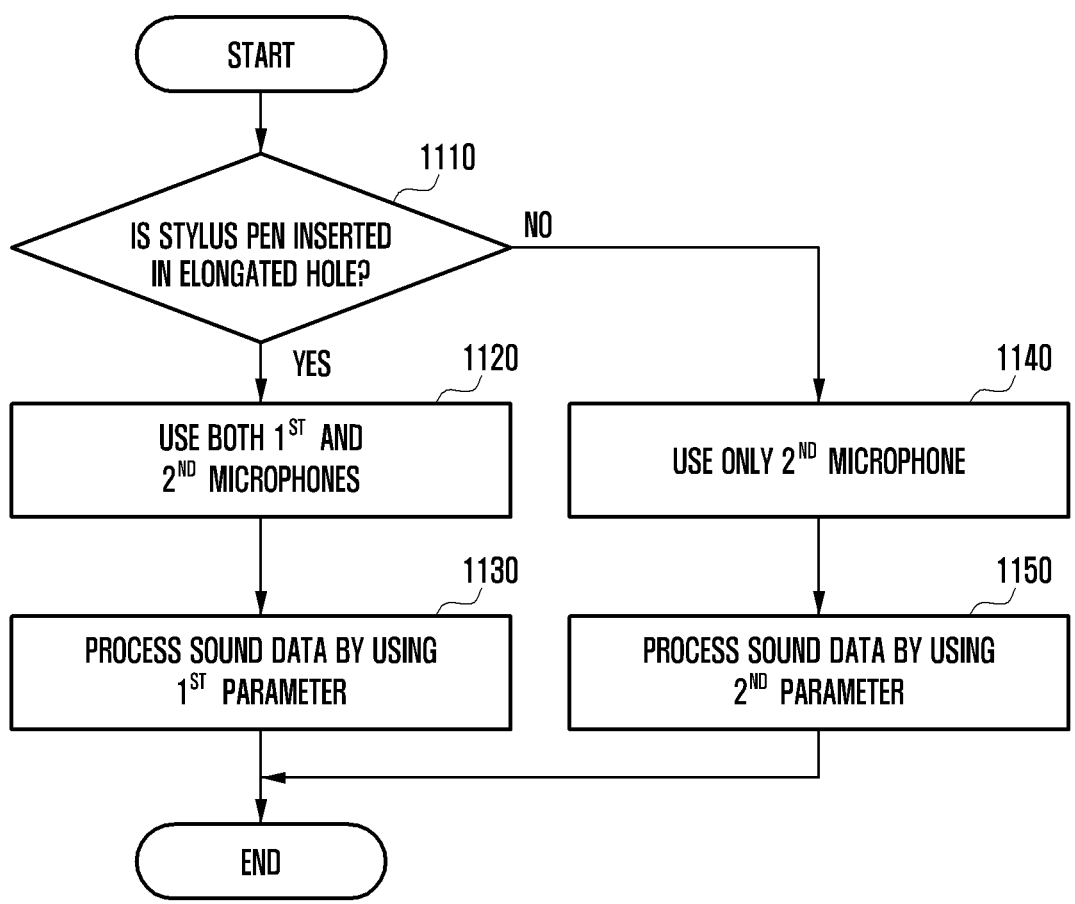
FIG. 11 is a flow diagram illustrating a method for controlling a microphone of an electronic device according to certain embodiments.

FIG. 11 is a flow diagram illustrating a method for controlling a microphone of an electronic device according to certain embodiments.

At operation 1110, the electronic device (e.g., the electronic device 300 of FIG. 3, especially, the first processor 320) may determine whether the stylus pen (e.g., the stylus pen 310 of FIG. 3) is inserted in the elongated hole.

When the stylus pen is inserted in the elongated hole, the electronic device may simultaneously use at operation 1120 both a first microphone (e.g., the first microphone 340 of FIG. 3) and a second microphone (e.g., the second microphone 314 of FIG. 4).

Then, at operation 1130, the electronic device may process sound data by using a first parameter.

When the stylus pen is not inserted in the elongated hole, the electronic device may use at operation 1140 the second microphone and exclude the first microphone.

Then, at operation 1150, the electronic device may process sound data by using a second parameter.

The FIG. 10 embodiment and the FIG. 11 embodiment are not mutually exclusive, and the same electronic device is capable of selectively operating in the FIG. 10 embodiment or the FIG. 11 embodiment.

According to certain embodiments, a method for controlling a microphone of an electronic device 300 may include the operation 1010 of identifying whether a stylus pen 310 is located in an elongated hole formed in a housing of the electronic device 300, the operation 1020 of simultaneously using both at least one first microphone 340 exposed through a first portion of the housing and a second microphone 314 included in the stylus pen 310 when the stylus pen 310 is located in the elongated hole, and the operation 1040 of using the first microphone 314 and exclude the second microphone when the stylus pen 310 is not located in the elongated hole.

According to certain embodiments, the method may further include operation of receiving sound data obtained from the second microphone 314 via wireless communication.

According to certain embodiments, the method may further include the operation 1030 of using at least one first parameter for processing sound data received from the first and second microphones 340 and 314 while the stylus pen 310 is located in the elongated hole, and the operation 1050 of using at least one second parameter, being different from the first parameter, for processing sound data received from the second microphone 314 while the stylus pen 310 is not located in the elongated hole.

While the disclosure has been particularly shown and described with reference to example embodiments thereof, it will be understood by those skilled in the art that certain changes in form and details may be made therein without departing from the scope of the subject matter as defined by the appended claims.

What is claimed is:

1. An electronic device comprising:
   a housing;
   at least one first microphone disposed within the housing and exposed through a first portion of the housing;
   a first wireless communication circuit disposed within the housing;
   an elongated hole formed in a second portion of the housing;
   a stylus pen detachably insertable into the elongated hole and including a second microphone;
   a processor disposed within the housing and functionally coupled to the at least one first microphone and the first wireless communication circuit; and
   a memory disposed within the housing and functionally coupled to the processor,
   wherein the memory stores instructions that are executable by the processor to cause the electronic device to:
   when the stylus pen is located in the elongated hole, operate both the at least one first microphone and the second microphone to detect sound, and use at least one first parameter for processing sound data received from the first and second microphones, and
   when the stylus pen is not located in the elongated hole, operate only the first microphone to detect sound and use at least one second parameter different from the first parameter, for processing sound data received from the second microphone.

2. The electronic device of claim 1, further comprising:
   a sensing circuit configured to sense whether the stylus pen is disposed in the elongated hole,
   wherein the instructions are executable by the processor to cause the electronic device to receive a signal from the sensing circuit.

3. The electronic device of claim 1, wherein the stylus pen further includes a second wireless communication circuit, and
   wherein the instructions are executable by the processor to cause the electronic device to receive sound data using the first wireless communication circuit and the second wireless communication circuit.

4. The electronic device of claim 3, wherein each of the first wireless communication circuit and the second wireless communication circuit is configured to support a Bluetooth low energy (BLE) technique.

5. The electronic device of claim 1, wherein the housing includes at least one first terminal protruding into the elongated hole,
   wherein the stylus pen includes at least one second terminal configured to contact the first terminal when the stylus pen is stowed within the elongated hole, and
   wherein the instructions are executable by the processor to cause the electronic device to receive a transmission of sound data detected through the stylus through the first terminal and the second terminal.

6. The electronic device of claim 1, wherein the instructions are executable by the processor to cause the electronic device to disable the second microphone while the stylus pen is removed from the elongated hole.

7. The electronic device of claim 1, wherein the instructions are executable by the processor to cause the electronic device to:
   use at least one first parameter for processing sound data received from the first and second microphones while the stylus pen is stowed within the elongated hole, and
   use at least one second parameter different from the first parameter, for processing sound data received from the first microphone while the stylus pen is removed from the elongated hole.

8. The electronic device of claim 1, further comprising:
   a transmission coil disposed within the housing and generating a magnetic field for wireless charging,
   wherein the stylus pen further includes a reception coil that charges a battery of the stylus pen by interoperation with the magnetic field formed by the transmission coil.

9. The electronic device of claim 1, wherein the stylus pen further includes at least one button, and wherein the second microphone is disposed at a position parallel to the at least one button in a longitudinal direction of the stylus pen.

10. An electronic device comprising:
a housing;
at least one first microphone disposed within the housing and exposed through a first portion of the housing;
a first wireless communication circuit disposed within the housing;
an elongated hole formed in a second portion of the housing;
a stylus pen detachably insertable into the elongated hole and including a second microphone;
a processor disposed within the housing and functionally connected to the at least one first microphone and the first wireless communication circuit; and
a memory disposed within the housing and functionally connected to the processor,
wherein the memory stores instructions that are executable by the processor to cause the electronic device to:
when the stylus pen is located in the elongated hole, operate both the at least one first microphone and the second microphone to detect sound, and use at least one first parameter for processing sound data received from the first and second microphones, and
when the stylus pen is not located in the elongated hole, operate only the second microphone to detect sound and use at least one second parameter different from the first parameter, for processing sound data received from the second microphone.

11. The electronic device of claim 10, further comprising:
a sensing circuit configured to sense whether the stylus pen is disposed in the elongated hole,
wherein the instructions are executable by the processor to cause the electronic device to receive a signal from the sensing circuit.

12. The electronic device of claim 10, wherein the stylus pen further includes a second wireless communication circuit, and
wherein the instructions are executable by the processor to cause the electronic device to receive sound data using the first wireless communication circuit and the second wireless communication circuit.

13. The electronic device of claim 12, wherein each of the first wireless communication circuit and the second wireless communication circuit is configured to support a Bluetooth low energy (BLE) technique.

14. The electronic device of claim 10, wherein the housing includes at least one first terminal protruding into the elongated hole,
wherein the stylus pen includes at least one second terminal configured to contact the first terminal when the stylus pen is stowed within the elongated hole, and
wherein the instructions are executable by the processor to cause the electronic device to receive a transmission of sound data detected through the stylus pen through the first terminal and the second terminal.

15. The electronic device of claim 10, further comprising:
a first coil disposed within the housing; and
a second coil disposed in the stylus pen,
wherein the instructions are executable by the processor to cause the electronic device to receive sound data through the first coil and the second coil.

16. The electronic device of claim 10, wherein the instructions cause the processor to disable the first microphone while the stylus pen is removed the elongated hole.

17. A method for controlling a first microphone of an electronic device, the method comprising:
identifying, by a sensor circuit, whether a stylus pen is located within an elongated hole formed in a housing of the electronic device;
when the stylus pen is located within the elongated hole, operating the first microphone and a second microphone of the stylus pen to detect sound and using at least one first parameter for processing sound data received from the first and second microphones; and
when the stylus pen is removed from the elongated hole, operating only the second microphone of the stylus pen and using at least one second parameter different from the first parameter for processing sound data received from the second microphone.

18. The method of claim 17, further comprising:
receiving sound data obtained from the second microphone via wireless communication.

19. The method of claim 17, wherein the electronic device comprises a first wireless communication circuit, and the stylus pen comprises a second wireless communication circuit, and the method further comprises:
receiving the sound data acquired by the second microphone using the first wireless communication circuit and the second wireless communication circuit.

20. The method of claim 19, wherein each of the first wireless communication circuit and the second wireless communication circuit is configured to support a Bluetooth low energy (BLE) technique.

21. The method of claim 17, wherein the electronic device includes at least one first terminal protruding into the elongated hole, and the stylus pen includes at least one second terminal configured to contact the first terminal when the stylus pen is stowed within the elongated hole, and the method further comprises:
receiving sound data acquired by the second microphone through the first terminal and the second terminal.

22. The method of claim 17, wherein the electronic device includes a first coil and the stylus includes a second coil, and the method further comprises:
receiving sound data acquired by the second microphone through the first coil and the second coil.

23. The method of claim 17, further comprising disabling the first microphone while the stylus pen is removed the elongated hole.

* * * * *